US012279351B2

(12) United States Patent
Takayashiki

(10) Patent No.: US 12,279,351 B2
(45) Date of Patent: Apr. 15, 2025

(54) ILLUMINATION DEVICE AND ILLUMINATION SYSTEM

(71) Applicant: Japan Display Inc., Tokyo (JP)

(72) Inventor: Yukio Takayashiki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/659,660

(22) Filed: May 9, 2024

(65) Prior Publication Data

US 2024/0292507 A1 Aug. 29, 2024

Related U.S. Application Data

(63) Continuation of application No. PCT/JP2022/033193, filed on Sep. 2, 2022.

(30) Foreign Application Priority Data

Nov. 16, 2021 (JP) ................................ 2021-186285

(51) Int. Cl.

| | |
|---|---|
| ***H05B 47/115*** | (2020.01) |
| ***F21S 8/00*** | (2006.01) |
| ***F21V 9/14*** | (2006.01) |
| ***F21V 14/08*** | (2006.01) |
| ***F21V 23/00*** | (2015.01) |
| ***F21W 111/023*** | (2006.01) |

(52) U.S. Cl.

CPC .............. *H05B 47/115* (2020.01); *F21S 8/00* (2013.01); *F21V 9/14* (2013.01); *F21V 14/08* (2013.01); *F21V 23/003* (2013.01); *F21W 2111/023* (2013.01)

(58) Field of Classification Search

CPC .. H05B 47/115; F21S 8/00; F21V 9/14; F21V 14/08; F21V 23/003

See application file for complete search history.

(56) References Cited

U.S. PATENT DOCUMENTS

| | | | | |
|---|---|---|---|---|
| 10,290,045 B2 * | 5/2019 | Tuo | H04W 4/024 | |
| 2010/0265100 A1 * | 10/2010 | Jalbout | H05B 47/115 | 340/944 |
| 2012/0181934 A1 * | 7/2012 | Knibbe | H05B 47/125 | 315/153 |

(Continued)

FOREIGN PATENT DOCUMENTS

| | | |
|---|---|---|
| JP | H02-065001 A | 3/1990 |
| JP | 2005-071624 A | 3/2005 |

(Continued)

OTHER PUBLICATIONS

Search Report issued in related International Patent Application No. PCT/JP2022/033193 mailed on Oct. 25, 2022 and English translation of same. 5 pages.

(Continued)

*Primary Examiner* — Bryon T Gyllstrom

(74) *Attorney, Agent, or Firm* — K&L Gates LLP

(57) ABSTRACT

An illumination device includes a detector configured to detect that a mobile terminal device has entered a communication area corresponding to the device, and a light irradiator configured to emit light for guiding a person with the mobile terminal device detected by the detector. The light irradiator emits light indicating a route through which the person with the mobile terminal device should proceed.

5 Claims, 23 Drawing Sheets

(56) References Cited

U.S. PATENT DOCUMENTS

| | | | | |
|---|---|---|---|---|
| 2012/0235579 | A1* | 9/2012 | Chemel | F21V 29/60 315/152 |
| 2014/0125451 | A1* | 5/2014 | Sako | H05B 47/115 340/4.2 |
| 2016/0007421 | A1* | 1/2016 | Tey Pons | H05B 47/12 315/153 |
| 2018/0153012 | A1* | 5/2018 | Lee | H04W 4/70 |
| 2020/0045796 | A1* | 2/2020 | Deixler | H05B 47/125 |
| 2021/0149011 | A1* | 5/2021 | Wetzker | G01S 5/0252 |
| 2021/0287544 | A1* | 9/2021 | Ricke | G08G 1/166 |

FOREIGN PATENT DOCUMENTS

| | | | |
|---|---|---|---|
| JP | 2009-177372 | A | 8/2009 |
| JP | 2011-009066 | A | 1/2011 |
| JP | 2019-169397 | A | 10/2019 |
| JP | 2021-524595 | A | 9/2021 |

OTHER PUBLICATIONS

Written Opinion issued in related International Patent Application No. PCT/JP2022/033193 mailed on Oct. 25, 2022. 4 pages.

Office Action issued in related Japanese Patent Application No. 2023-562150, mailed on Sep. 3, 2024 and English translation of same. 8 pages.

* cited by examiner

FIG.6

| ILLUMINATION DEVICE | INTERRUPT TARGET |
|---|---|
| R1 | BEACON, SMARTPHONE |
| R2 | BEACON, SMARTPHONE |
| ⋮ | ⋮ |

FIG.7

| MOBILE TERMINAL DEVICE (USER) | ROUTE |
|---|---|
| IDA | R1 |
| IDB | R2 |
| ⋮ | ⋮ |

FIG.8

| ROUTE | ILLUMINATION DEVICES INCLUDED IN ROUTE | IRRADIATION PATTERN |
|---|---|---|
| R1 | 100-1 TO 100-5 | HORIZONTALLY LONG ELLIPTICAL SHAPE |
| R2 | 100-1 TO 100-3, 100-6, 100-9 TO 100-11 | |
| ⋮ | ⋮ | |

ILLUMINATION DEVICE AND ILLUMINATION SYSTEM

CROSS-REFERENCE TO RELATED APPLICATION

This application is a continuation of International Patent Application No. PCT/JP2022/033193 filed on Sep. 2, 2022, which designates the United states, incorporated herein by reference, and which claims the benefit of priority from Japanese Patent Application No. 2021-186285 filed on Nov. 16, 2021, incorporated herein by reference.

BACKGROUND

1. Technical Field

The present disclosure relates to an illumination device and an illumination system.

2. Description of the Related Art

A spotlight is known as an illumination instrument provided at the ceiling of a path such as a corridor. The spotlight is embedded at the ceiling of the path or provided at a wall in the vicinity of the ceiling in some cases. The spotlight irradiates, for example, the floor surface of the path with light. The spotlight can be turned on to emit light and turned off to stop the irradiation by switching a power switch on and off. Japanese Patent Application Laid-open Publication No. H02-065001 discloses an illumination instrument in which a light source such as a light emitting diode (LED) is combined with a thin lens fabricated with a prism pattern and that changes a light distribution angle by changing the distance between the light source and the thin lens.

A plurality of above-described illumination instruments are provided in some cases. A person cannot be guided nor directed by turning on and off the provided illumination instruments.

The present disclosure is made in view of the above-described problem and intended to provide an illumination device and an illumination system that are capable of guiding a person when provided on a path.

SUMMARY

An illumination device according to an embodiment of the present disclosure includes a detector configured to detect that a mobile terminal device has entered a communication area corresponding to the device, and a light irradiator configured to emit light for guiding a person with the mobile terminal device detected by the detector. The light irradiator emits light indicating a route through which the person with the mobile terminal device should proceed.

An illumination system according to an embodiment of the present disclosure includes a plurality of illumination devices each including a detector and a light irradiator, the detector being configured to detect that a mobile terminal device has entered a communication area corresponding to the device, the light irradiator being configured to emit light for guiding a person with the mobile terminal device detected by the detector. The illumination devices are provided along a route through which the person with the mobile terminal device should proceed, the light irradiator of each of the illumination devices emits light indicating a route through which the person with the mobile terminal device should proceed, and parts of communication areas corresponding to adjacent illumination devices among the illumination devices overlap each other.

BRIEF DESCRIPTION OF THE DRAWINGS

FIG. 6 is a diagram illustrating an example of data related to interrupt targets for the illumination devices;

FIG. 7 is a diagram illustrating an example of data indicating routes through which users of mobile terminal devices should proceed;

FIG. 8 is a diagram illustrating an example of data related to illumination devices included in routes and irradiation patterns;

DETAILED DESCRIPTION

Aspects (embodiments) of the present disclosure will be described below in detail with reference to the accompanying drawings. Contents described below in the embodiments do not limit the present disclosure. Components described below include those that could be easily thought of by the skilled person in the art and those identical in effect. Components described below may be combined as appropriate. What is disclosed herein is merely exemplary, and any modification that could be easily thought of by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases.

Illumination Device and Illumination System

Figure 1:
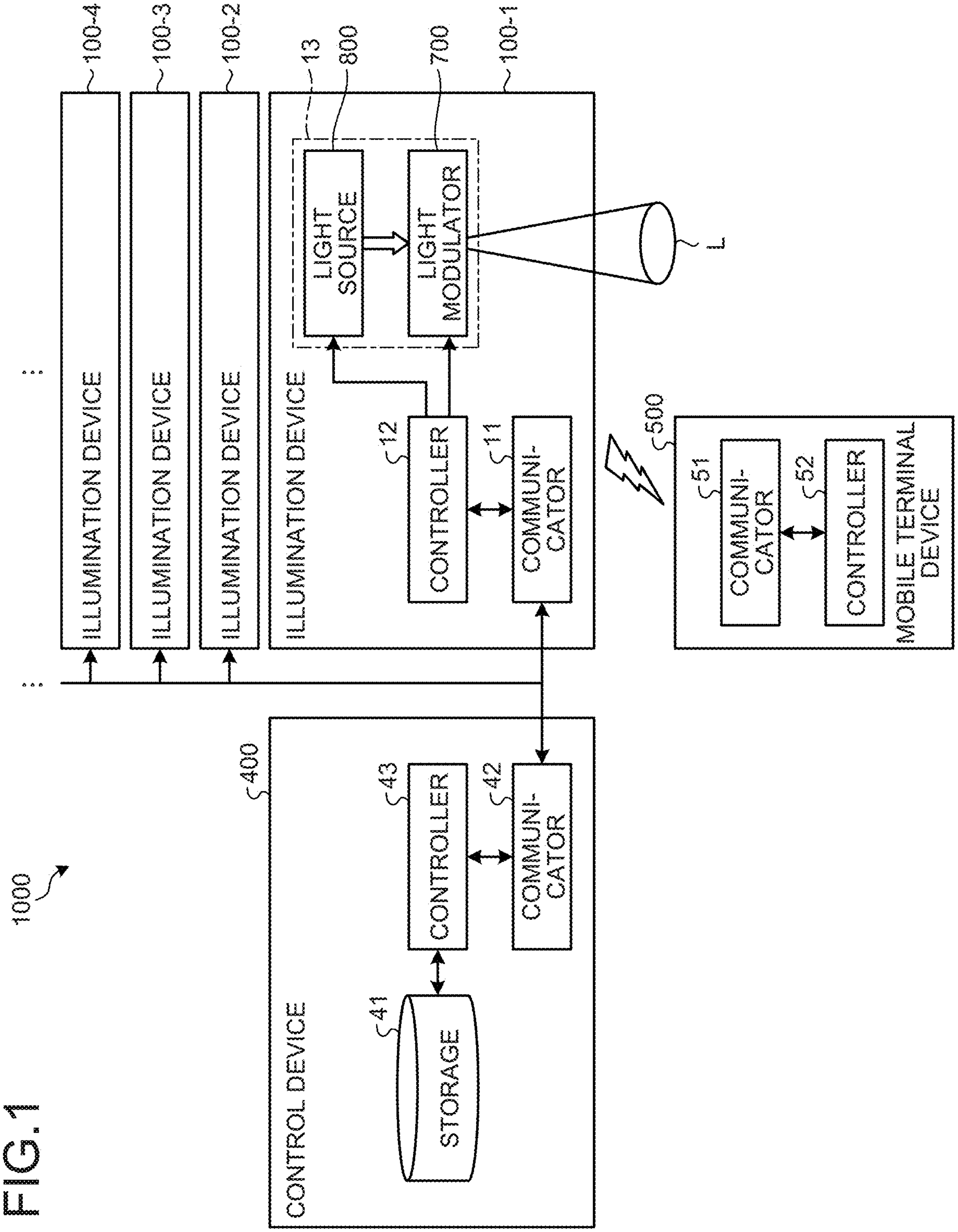
FIG. 1 is a diagram illustrating an exemplary configuration of an illumination system including illumination devices according to the present embodiment.

FIG. 1 is a diagram illustrating an exemplary configuration of an illumination system 1000 including illumination devices according to the present embodiment. In FIG. 1, the illumination system 1000 includes a plurality of illumination devices 100-1, 100-2, 100-3, 100-4, . . . , and a control device 400.

The illumination devices 100-1, 100-2, 100-3, 100-4, . . . are provided at, for example, the ceiling of a path to guide a user. The illumination devices 100-1, 100-2, 100-3, 100-4, . . . are provided at intervals.

The illumination device 100-1 has the same configuration as the other illumination devices 100-2, 100-3, 100-4, . . . . Thus, the following description will be made with the configuration of the illumination device 100-1 as a representative. Note that, the illumination devices 100-1, 100-2, 100-3, 100-4, . . . are collectively referred to as illumination devices 100 in some cases in the following description.

The illumination device 100-1 includes a communicator 11, a controller 12, and a light irradiator 13. The communicator 11 performs communication with other devices. The communicator 11 performs communication with the control device 400. The communicator 11 performs communication with the control device 400, for example, in a wired manner. The communicator 11 also performs communication with a mobile terminal device 500 that a user has. For example, the communicator 11 performs communication with the mobile terminal device 500 in a wireless manner in a communication area of the communicator 11. Communication between the communicator 11 and the mobile terminal device 500 is not performed when the mobile terminal device 500 is positioned outside the communication area of the communicator 11. Thus, the communicator 11 functions as a detector configured to detect the mobile terminal device 500.

The light irradiator 13 includes a light source 800 and a light modulator 700. The light source 800 is, for example, an LED. The light modulator 700 can change the shape and size of light. Light from the light source 800 is incident on the light modulator 700. The light modulator 700 performs light modulation of the light incident from the light source 800. The light modulation performed by the light modulator 700 changes the shape and size of the incident light. The light modulated by the light modulator 700 is emitted from the light modulator 700. For example, the floor surface of a path is irradiated with light L emitted from the light modulator 700. A detailed configuration of the light irradiator 13 will be described later.

The control device 400 includes a storage 41, a communicator 42, and a controller 43. The storage 41 stores data necessary for processing by the controller 43. The data stored in the storage 41 will be described later. The communicator 42 performs communication with other devices. The controller 43 controls each component of the control device 400.

The mobile terminal device 500 includes a communicator 51 and a controller 52. The mobile terminal device 500 is, for example, a smartphone. A laptop computer or a tablet terminal that are movable may be used as the mobile terminal device 500.

The communicator 51 performs communication with the communicator 11 in the communication area of the communicator 11 of the illumination device 100-1. Communication between the communicator 11 and the communicator 51 is performed by, for example, short-distance wireless communication. The short-distance wireless communication is, for example, Bluetooth (registered trademark; same below). Wireless communication by Bluetooth Low Energy (BLE) of a smartphone may be performed. A smartphone having a beacon function or a dedicated terminal device having a beacon function (hereinafter referred to as a beacon) may be used as the mobile terminal device 500. The controller 52 controls each component of the mobile terminal device 500.

Example of Path

Figure 2:
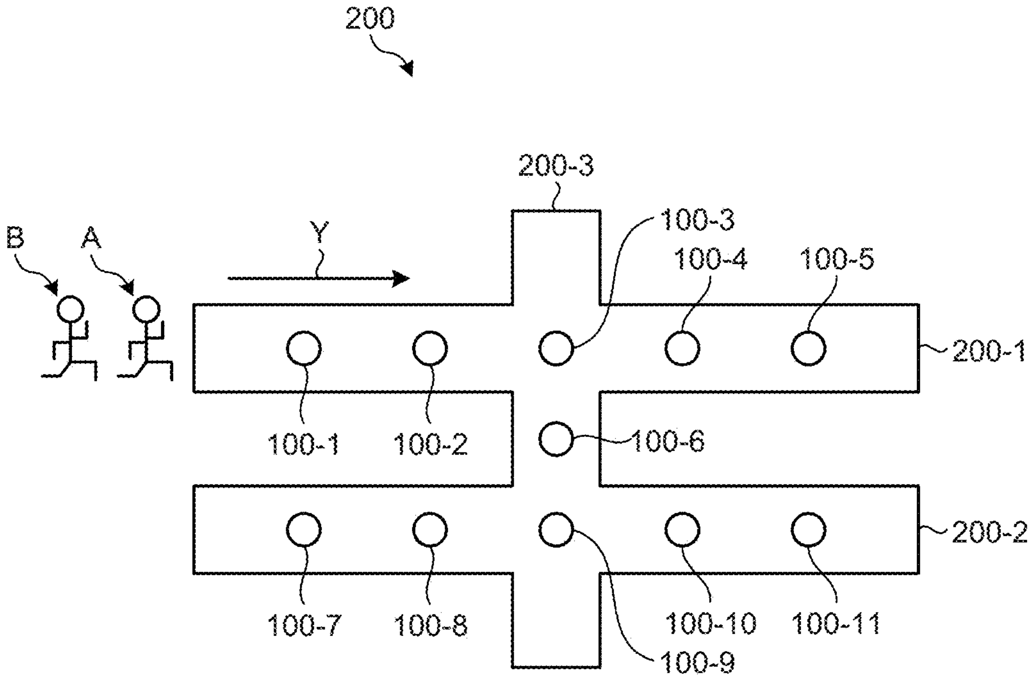
FIG. 2 is a diagram illustrating an example of a path in which the illumination devices are provided.

FIG. 2 is a diagram illustrating an example of a path in which the illumination devices 100 are provided. As in FIG. 2, a path 200 is constituted by paths 200-1, 200-2, and 200-3. The paths 200-1, 200-2, and 200-3 extend straight. The path 200-1 and the path 200-2 are arranged in parallel to each other. The path 200-3 intersects the path 200-1 and intersects the path 200-2.

In the present example, a case where a user A and a user B proceeding in the direction of arrow Y from the left side of the path 200-1 in the drawing are guided will be described. In addition, in the present example, a case where the user A and the user B are guided to routes different from each other will be described. In the present example, the user A is guided from the left end of the path 200-1 in the drawing to the right end of the path 200-1 in the drawing. In addition, in the present example, the user B is guided from the left end of the path 200-1 in the drawing to the right end of the path 200-2 in the drawing through the path 200-3.

The illumination devices 100-1 to 100-11 are provided on the path 200. In the present example, the five illumination devices 100-1 to 100-5 are provided on the path 200-1. The five illumination devices 100-7 to 100-11 are provided on the path 200-2. The three illumination devices 100-3, 100-6, and 100-9 are provided on the path 200-3. The illumination device 100-3 is provided at an intersection part of the path 200-1 and the path 200-3. The illumination device 100-9 is provided at an intersection part of the path 200-2 and the path 200-3.

For example, the illumination devices 100-1 to 100-11 are embedded in the ceiling of the path 200. The light irradiators 13 of the illumination devices 100-1 to 100-11 emit light, for example, from the ceiling of the path 200 toward the floor surface of the path 200. The illumination devices 100-1 to 100-11 may emit light toward a wall instead of the floor surface. Note that the illumination devices 100-1 to 100-11 may be provided, for example, at a wall in the vicinity of the ceiling of the path 200.

The illumination system 1000 including the illumination devices 100 may be employed, for example, at a facility where health checkup is performed. At a facility where health checkup including a plurality of medical examination items is performed, rooms (not illustrated) corresponding to the respective medical examination items are each provided halfway through the path 200. In a case where items to be examined are determined, the users A and B can be guided by turning on and off the illumination devices 100-1 to 100-11 along a course. Thus, the users A and B can be guided to directions to follow, in other words, routes by emitting light for guiding light for guiding a person with a mobile terminal device. The user A and the user B may be guided to the same route, or the user A and the user B may be guided to separate routes.

The illumination system 1000 including the illumination devices 100 may be employed at, for example, an art gallery or a museum. In a case where a plurality of exhibits (not illustrated) are provided halfway through the path 200 and a viewing route is determined, the users A and B can be guided by turning on and off the illumination devices 100-1 to 100-11 along a course. Thus, the users A and B can be guided to directions to follow, in other words, routes by emitting light for guiding light for guiding a person with a mobile terminal device. The user A and the user B may be guided to the same route, or the user A and the user B may be guided to separate routes.

Note that the path 200 does not necessarily need to be provided indoor but may be provided outdoor as long as the illumination devices 100 can be provided. For example, the path 200 may be provided outdoor in a case where the illumination devices 100 can be provided at street lights.

Example of Communication Areas

Figure 3:
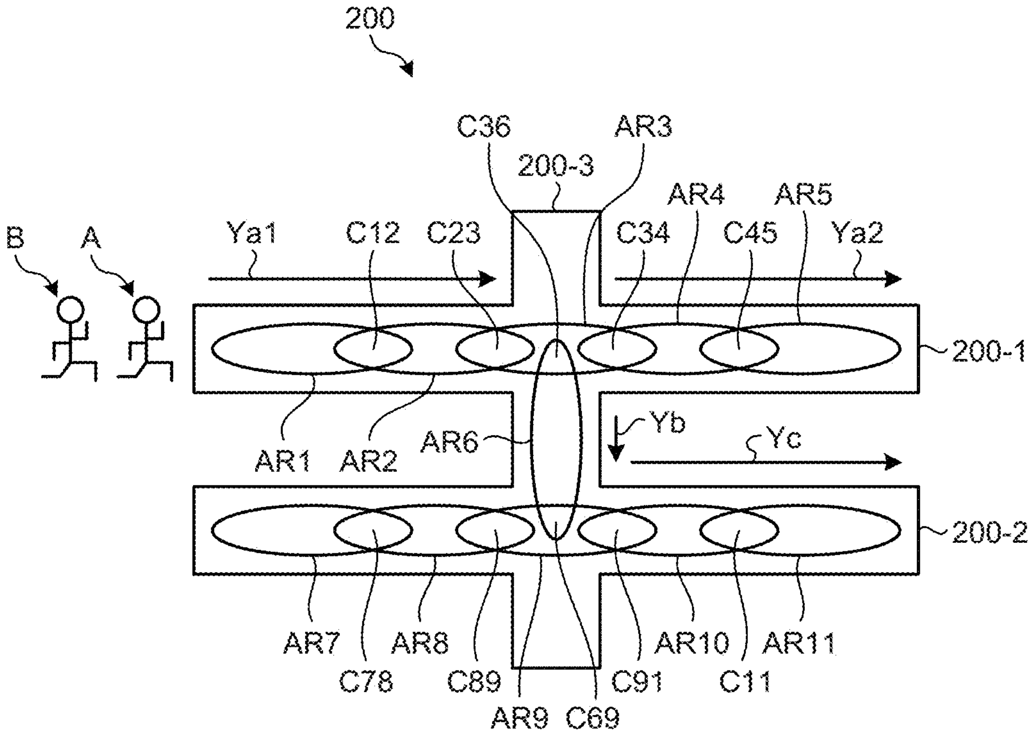
FIG. 3 is a diagram illustrating an example of communication areas AR1 to AR11 of communicators in the respective illumination devices illustrated in FIG. 2.

FIG. 3 is a diagram illustrating an example of communication areas AR1 to AR11 of the communicators 11 in the respective illumination devices 100 illustrated in FIG. 2. The communication area AR1 illustrates an example of the communication area of the communicator 11 in the illumination device 100-1 in FIG. 2. The communication area AR2 illustrates an example of the communication area of the communicator 11 in the illumination device 100-2 in FIG. 2. The communication area AR3 illustrates an example of the communication area of the communicator 11 in the illumination device 100-3 in FIG. 2. The communication area AR4 illustrates an example of the communication area of the communicator 11 in the illumination device 100-4 in FIG. 2. The communication area AR5 illustrates an example of the communication area of the communicator 11 in the illumination device 100-5 in FIG. 2. The communication area AR6 illustrates an example of the communication area of the communicator 11 in the illumination device 100-6 in FIG. 2. The communication area AR7 illustrates an example of the communication area of the communicator 11 in the illumination device 100-7 in FIG. 2. The communication area AR8 illustrates an example of the communication area of the communicator 11 in the illumination device 100-8 in FIG. 2. The communication area AR9 illustrates an example of the communication area of the communicator 11 in the illumination device 100-9 in FIG. 2. The communication area AR10 illustrates an example of the communication area of the communicator 11 in the illumination device 100-10 in FIG. 2. The communication area AR11 illustrates an example of the communication area of the communicator 11 in the illumination device 100-11 in FIG. 2.

The communication areas AR1 to AR11 illustrated in FIG. 3 serve as detection areas for detecting the mobile terminal device 500. As illustrated in FIG. 3, part of the communication area AR1 and part of the communication area AR2 overlap each other. In other words, parts of communication areas corresponding to adjacent illumination devices 100 overlap each other. The mobile terminal device 500 being positioned at this overlapping part C12 is detected by the communicator 11 in the illumination device 100-1 corresponding to the communication area AR1 and is also detected by the communicator 11 in the illumination device 100-2 corresponding to the communication area AR2.

Part of the communication area AR2 and part of the communication area AR3 overlap each other. In other words, parts of communication areas corresponding to adjacent illumination devices 100 overlap each other. The mobile terminal device 500 being positioned at this overlapping part C23 is detected by the communicator 11 in the illumination device 100-2 corresponding to the communication area AR2 and is also detected by the communicator 11 in the illumination device 100-3 corresponding to the communication area AR3.

Part of the communication area AR3 and part of the communication area AR4 overlap each other. In other words, parts of communication areas corresponding to adjacent illumination devices 100 overlap each other. The mobile terminal device 500 being positioned at this overlapping part C34 is detected by the communicator 11 in the illumination device 100-3 corresponding to the communication area AR3 and is also detected by the communicator 11 in the illumination device 100-4 corresponding to the communication area AR4.

Part of the communication area AR4 and part of the communication area AR5 overlap each other. In other words, parts of communication areas corresponding to adjacent illumination devices 100 overlap each other. The mobile terminal device 500 being positioned at this overlapping part C45 is detected by the communicator 11 in the illumination device 100-4 corresponding to the communication area AR4 and is also detected by the communicator 11 in the illumination device 100-5 corresponding to the communication area AR5.

Part of the communication area AR7 and part of the communication area AR8 overlap each other. In other words, parts of communication areas corresponding to adjacent illumination devices 100 overlap each other. The mobile terminal device 500 being positioned at this overlapping part C78 is detected by the communicator 11 in the illumination device 100-8 corresponding to the communication area AR7 and is also detected by the communicator 11 in the illumination device 100-8 corresponding to the communication area AR8.

Part of the communication area AR8 and part of the communication area AR9 overlap each other. In other words, parts of communication areas corresponding to adjacent illumination devices 100 overlap each other. The mobile terminal device 500 being positioned at this overlapping part C89 is detected by the communicator 11 in the illumination device 100-8 corresponding to the communication area AR8 and is also detected by the communicator 11 in the illumination device 100-9 corresponding to the communication area AR9.

Part of the communication area AR9 and part of the communication area AR10 overlap each other. In other words, parts of communication areas corresponding to adjacent illumination devices 100 overlap each other. The mobile terminal device 500 being positioned at this overlapping part C91 is detected by the communicator 11 in the illumination device 100-9 corresponding to the communication area AR9 and is also detected by the communicator 11 in the illumination device 100-10 corresponding to the communication area AR10.

Part of the communication area AR10 and part of the communication area AR11 overlap each other. In other words, parts of communication areas corresponding to adjacent illumination devices 100 overlap each other. The mobile terminal device 500 being positioned at this overlapping part C11 is detected by the communicator 11 in the illumination device 100-10 corresponding to the communication area AR10 and is also detected by the communicator 11 in the illumination device 100-11 corresponding to the communication area AR11.

Part of the communication area AR3 and part of the communication area AR6 overlap each other. In other words, parts of communication areas corresponding to adjacent illumination devices 100 overlap each other. The mobile terminal device 500 being positioned at this overlapping part C36 is detected by the communicator 11 in the illumination device 100-3 corresponding to the communication area AR3 and is also detected by the communicator 11 in the illumination device 100-6 corresponding to the communication area AR6.

Part of the communication area AR9 and part of the communication area AR6 overlap each other. In other words, parts of communication areas corresponding to adjacent illumination devices 100 overlap each other. The mobile terminal device 500 being positioned at this overlapping part C69 is detected by the communicator 11 in the illumination device 100-9 corresponding to the communication area AR9 and is also detected by the communicator 11 in the illumination device 100-6 corresponding to the communication area AR6.

In the present example, the user A is guided in directions illustrated with arrows Ya1 and Ya2. Thus, the user A moves through the path 200-1 from the left side toward the right side in the drawing. Accordingly, the user A sequentially passes through the communication areas AR1, AR2, AR3, AR4, and AR5.

In addition, in the present example, the user B is sequentially guided in directions illustrated with the arrow Ya1, an arrow Yb, and an arrow Yc. Thus, the user B moves through the path 200-1 from the left side toward the right side in the drawing and then moves through the path 200-3 from the upper side toward the lower side in the drawing and further moves through the path 200-2 from the left side toward the right side in the drawing. Accordingly, the user B sequentially passes through the communication areas AR1, AR2, AR3, AR6, AR9, AR10, and AR11.

Example of Light Emitted when User is Guided

Figure 4:
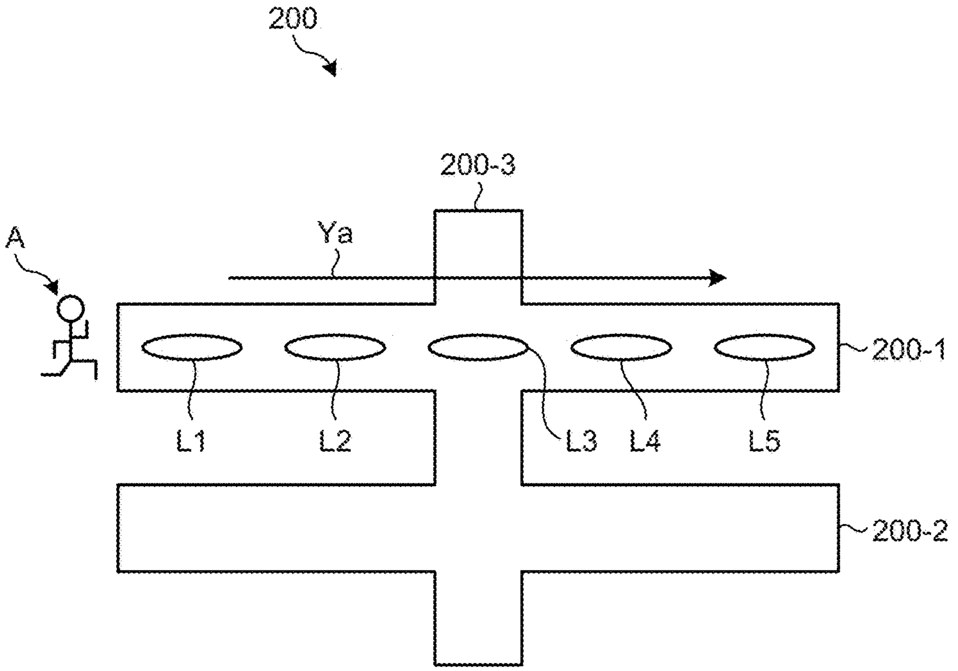
FIG. 4 is a diagram illustrating an example of light emitted when a user is guided.
Figure 5:
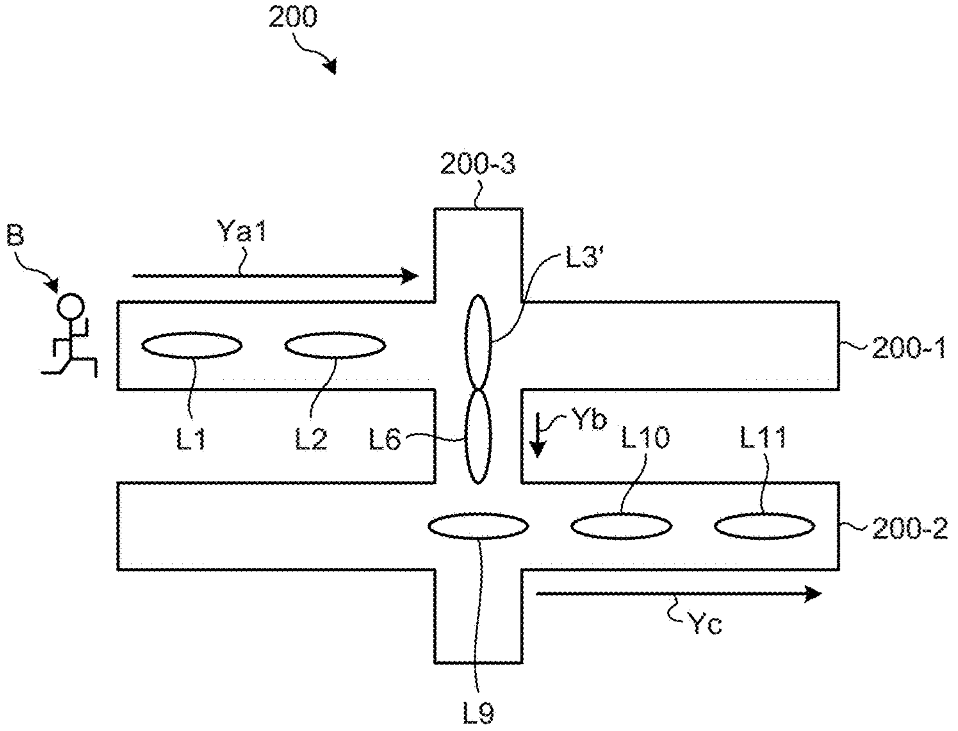
FIG. 5 is a diagram illustrating an example of light emitted when a user is guided.

FIGS. 4 and 5 are each a diagram illustrating an example of light emitted when a user is guided. FIG. 4 is a diagram illustrating an example of light emitted when the user A is guided.

In FIG. 4, the illumination devices 100-1 and 100-2, 100-3, 100-4, and 100-5 are provided along a route through which the user A should proceed. Light L1 is light emitted by the light irradiator 13 in the illumination device 100-1. Light L2 is light emitted by the light irradiator 13 in the illumination device 100-2. Light L3 is light emitted by the light irradiator 13 in the illumination device 100-3. Light L4 is light emitted by the light irradiator 13 in the illumination device 100-4. Light L5 is light emitted by the light irradiator 13 in the illumination device 100-5. The lights L1, L2, L3, L4, and L5 each have an elliptical shape. The long axis of each elliptical shape is aligned with the direction of an arrow Ya. With the long axis of each elliptical shape aligned with the direction of the arrow Ya, it is possible to indicate a direction in which the user A should proceed, in other words, a route through which the user A should proceed.

Moreover, since not only light 100L1 corresponding to the communication area AR1 at the position of the user A but also the light L2 corresponding to the communication area AR2 at the position of a proceeding destination are emitted at the part C12 (refer to FIG. 3) where the communication area AR1 corresponding to the light L1 and the communication area AR2 corresponding to the light L2 overlap each other as described above, the user A can understand a direction to proceed. Similarly, since not only light corresponding to a communication area at the position of the user A but also light corresponding to a communication area at the position of a proceeding destination are emitted at the parts C23, C34, and C45 where adjacent communication areas overlap each other, the user A can understand a direction to proceed. In this manner, the user A can be guided in the direction of the arrow Ya by sequentially emitting the lights L1, L2, L3, L4, and L5 by using the illumination devices 100.

FIG. 5 is a diagram illustrating an example of light emitted when the user B is guided. In FIG. 5, the illumination devices 100-1, 100-2, 100-3, 100-6, 100-9, 100-10, and 100-11 are provided along a route through which the user B should proceed. Light L1 is light emitted by the light irradiator 13 in the illumination device 100-1. Light L2 is light emitted by the light irradiator 13 in the illumination device 100-2. Light L3' is light emitted by the light irradiator 13 in the illumination device 100-3. Light L6 is light emitted by the light irradiator 13 in the illumination device 100-6. Light L9 is light emitted by the light irradiator 13 in the illumination device 100-9. Light L10 is light emitted by the light irradiator 13 in the illumination device 100-10. Light L11 is light emitted by the light irradiator 13 in the illumination device 100-11. The lights L1, L2, L3', L6, L9, L10, and L11 each have an elliptical shape. With the long axis of each elliptical shape aligned with the direction of the arrow Ya1, Yb, or Yc, it is possible to indicate a direction in which the user B should proceed, in other words, a route through which the user B should proceed.

As described above, since not only light corresponding to a communication area at the position of the user B but also light corresponding to a communication area at the position of a proceeding destination are emitted at the parts C12, C23, C36, C69, C91, and C11 where adjacent communication areas overlap each other, the user B can understand a direction to proceed. In this manner, the user B can be guided in the directions of the arrows Ya1, Yb, and Yc by sequentially emitting the lights L1, L2, L3', L6, L9, L10, and L11 by using the illumination devices 100.

As illustrated in FIG. 4, the long axis of the elliptical shape of the light L3 is aligned with the direction of the arrow Ya, in other words, a direction in which the path 200-1 extends. However, as illustrated in FIG. 5, the long axis of the elliptical shape of the light L3' is aligned with the direction of the arrow Yb, in other words, a direction in which the path 200-3 extends. The light L3 and the light L3' are each light emitted by the light irradiator 13 in the illumination device 100-3. Such difference between the directions of the long axes of the elliptical shapes is due to an effect of the light modulator 700 of the light irradiator 13 in the illumination device 100-3. The effect of the light modulator 700 will be described later.

Example of Storage Contents of Storage

FIGS. 6 to 8 are diagrams illustrating an example of data stored in the storage 41 in the control device 400. FIG. 6 is a diagram illustrating an example of data related to interrupt targets for the illumination devices. In the present example, the interrupt targets for the illumination device 100-1 are a beacon and a smartphone as illustrated in FIG. 6. The interrupt targets for the illumination device 100-2 are a beacon and a smartphone. Interrupt targets can be individually sets for the other illumination devices 100-3 to 100-11.

FIG. 7 is a diagram illustrating an example of data indicating routes through which users of mobile terminal devices should proceed. FIG. 7 assumes that each user has a mobile terminal device and the user and the mobile terminal device integrally move. The data illustrated in FIG. 7 associates the user of each mobile terminal device with a route through which the user should proceed. In the present example, identification data that the user A has is IDA, and identification data that the user B has is IDB. As illustrated in FIG. 7, the route of the user A moving with the mobile terminal device of the identification data IDA is a route R1. The route of the user B moving with the mobile terminal device of the identification data IDB is a route R2.

FIG. 8 is a diagram illustrating an example of data related to illumination devices included in routes and irradiation patterns. The data is stored in the storage 41 in the control device 400. In the present example, as illustrated in FIG. 8, the illumination devices 100-1 to 100-5 are included in the route R1. The illumination devices 100-1 to 100-3, 100-6, and 100-9 to 100-11 are included in the route R2. In addition, data related to the irradiation pattern of light, in other words, the shape and size of light corresponding to the route R1 is included for each illumination device included in the route R1. In other words, data related to the shape and size of light indicating a direction to proceed is included for guiding along the route R1. Similarly, data related to the irradiation pattern of light, in other words, the shape and size of light corresponding to the route R2 is included for each illumination device included in the route R2.

Example of Communication Areas Through which User Guided Through Route Moves

Figure 9:
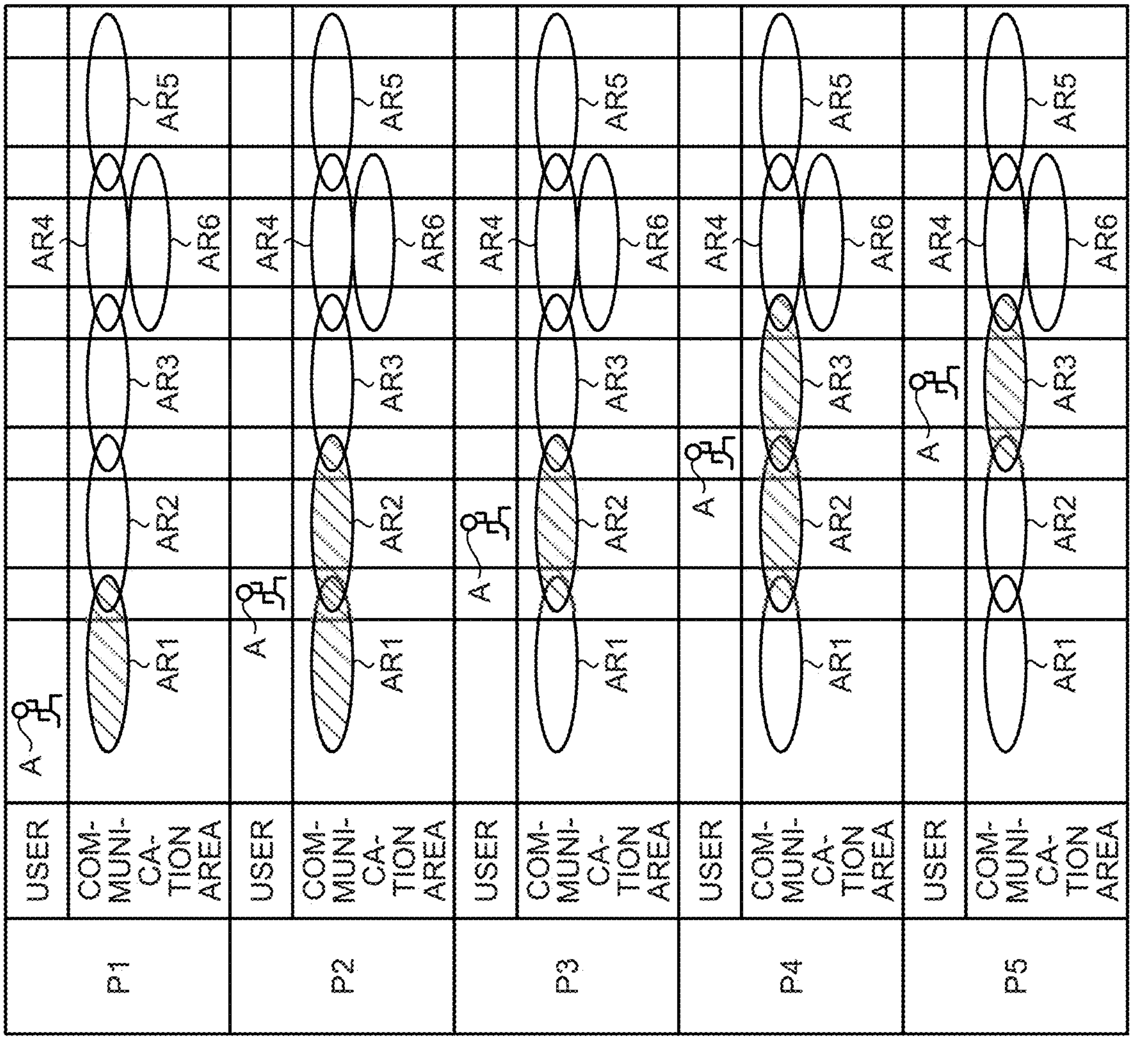
FIG. 9 is a diagram illustrating an example of communication areas through which a user guided through a route moves.
Figure 10:
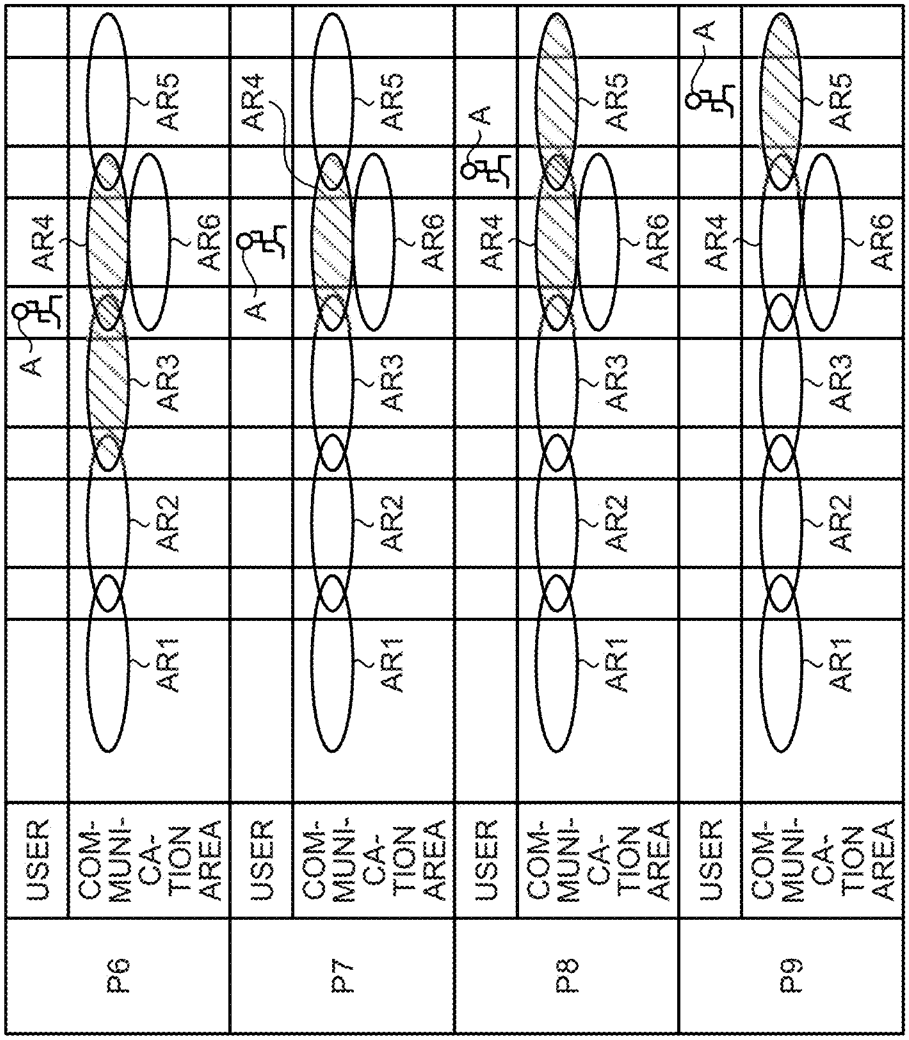
FIG. 10 is a diagram illustrating an example of communication areas through which the user guided through the route moves.

FIGS. 9 and 10 are diagrams illustrating an example of communication areas through which a user guided through a route moves. FIGS. 9 and 10 illustrate the relation between the position of the user A and communication areas in states P1 to P9. In FIGS. 9 and 10, a hatched communication area indicates that light is emitted by an illumination device corresponding to the communication area.

In FIG. 9, the state P1 indicates that the user A is positioned in the communication area AR1. The illumination device 100-1 corresponding to the communication area AR1 detects that the mobile terminal device 500 that the user A has is positioned in the communication area AR1. Accordingly, the illumination device 100-1 corresponding to the communication area AR1 emits light.

The state P2 indicates that the user A is positioned in the communication area AR1 and the communication area AR2. The illumination device 100-1 corresponding to the communication area AR1 emits light as in the state P1. Simultaneously, the illumination device 100-2 corresponding to the communication area AR2 detects that the mobile terminal device 500 that the user A has is positioned in the communication area AR2. Accordingly, the illumination device 100-2 corresponding to the communication area AR2 emits light.

The state P3 indicates that the user A is positioned in the communication area AR2. The illumination device 100-2 corresponding to the communication area AR2 emits light as in the state P2.

The state P4 indicates that the user A is positioned in the communication area AR2 and the communication area AR3. The illumination device 100-2 corresponding to the communication area AR2 emits light as in the state P3. Simultaneously, the illumination device 100-3 corresponding to the communication area AR3 detects that the mobile terminal device 500 that the user A has is positioned in the communication area AR3. Accordingly, the illumination device 100-3 corresponding to the communication area AR3 emits light.

The state P5 indicates that the user A is positioned in the communication area AR3. The illumination device 100-3 corresponding to the communication area AR3 emits light as in the state P4.

In FIG. 10, the state P6 indicates that the user A is positioned in the communication area AR3 and the communication area AR4. The illumination device 100-3 corresponding to the communication area AR3 emits light as in the state P5. Simultaneously, the illumination device 100-4 corresponding to the communication area AR4 detects that the mobile terminal device 500 that the user A has is positioned in the communication area AR4. Accordingly, the illumination device 100-4 corresponding to the communication area AR4 emits light.

The state P6 indicates that the user A is positioned also in the communication area AR6. The illumination device 100-6 corresponding to the communication area AR6 detects that the mobile terminal device 500 that the user A has is positioned in the communication area AR6. However, the illumination device 100-6 is not positioned in a direction in which the user A should proceed, and accordingly, does not emit light.

The state P7 indicates that the user A is positioned in the communication area AR4. The illumination device 100-4 corresponding to the communication area AR4 emits light as in the state P6.

The state P8 indicates that the user A is positioned in the communication area AR4 and the communication area AR5. The illumination device 100-4 corresponding to the communication area AR4 emits light as in the state P7. Simultaneously, the illumination device 100-5 corresponding to the communication area AR5 detects that the mobile terminal device 500 that the user A has is positioned in the communication area AR5. Accordingly, the illumination device 100-5 corresponding to the communication area AR5 emits light.

The state P9 indicates that the user A is positioned in the communication area AR5. The illumination device 100-5 corresponding to the communication area AR5 emits light as in the state P8.

As in the above-described states P1 to P2, for the user A, light is sequentially emitted by the illumination devices 100-1 to 100-5. The user A can be guided through a route with light irradiation by the illumination devices 100-1 to 100-5.

Figure 11:
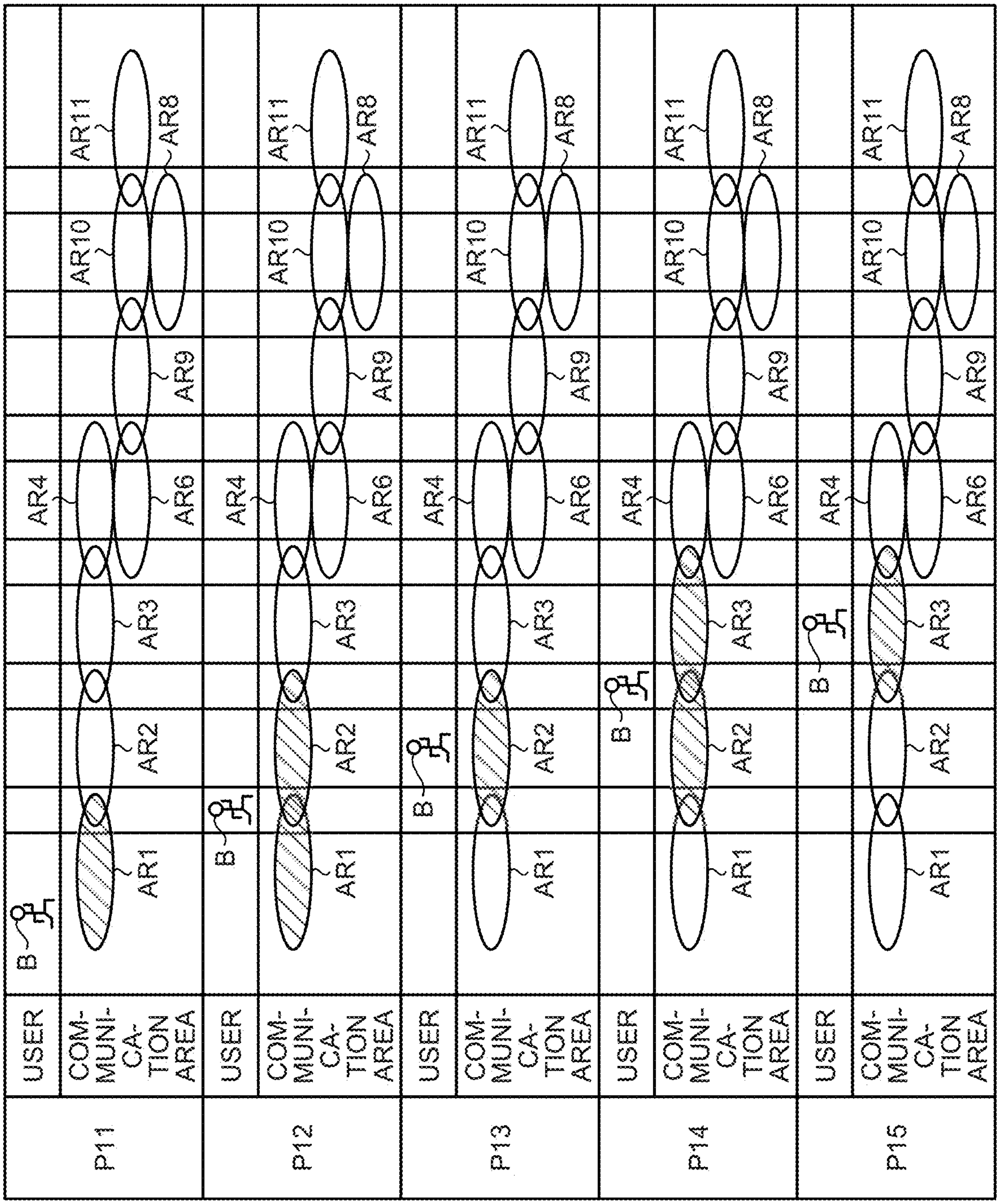
FIG. 11 is a diagram illustrating another example of communication areas through which a user guided through a route moves.
Figure 12:
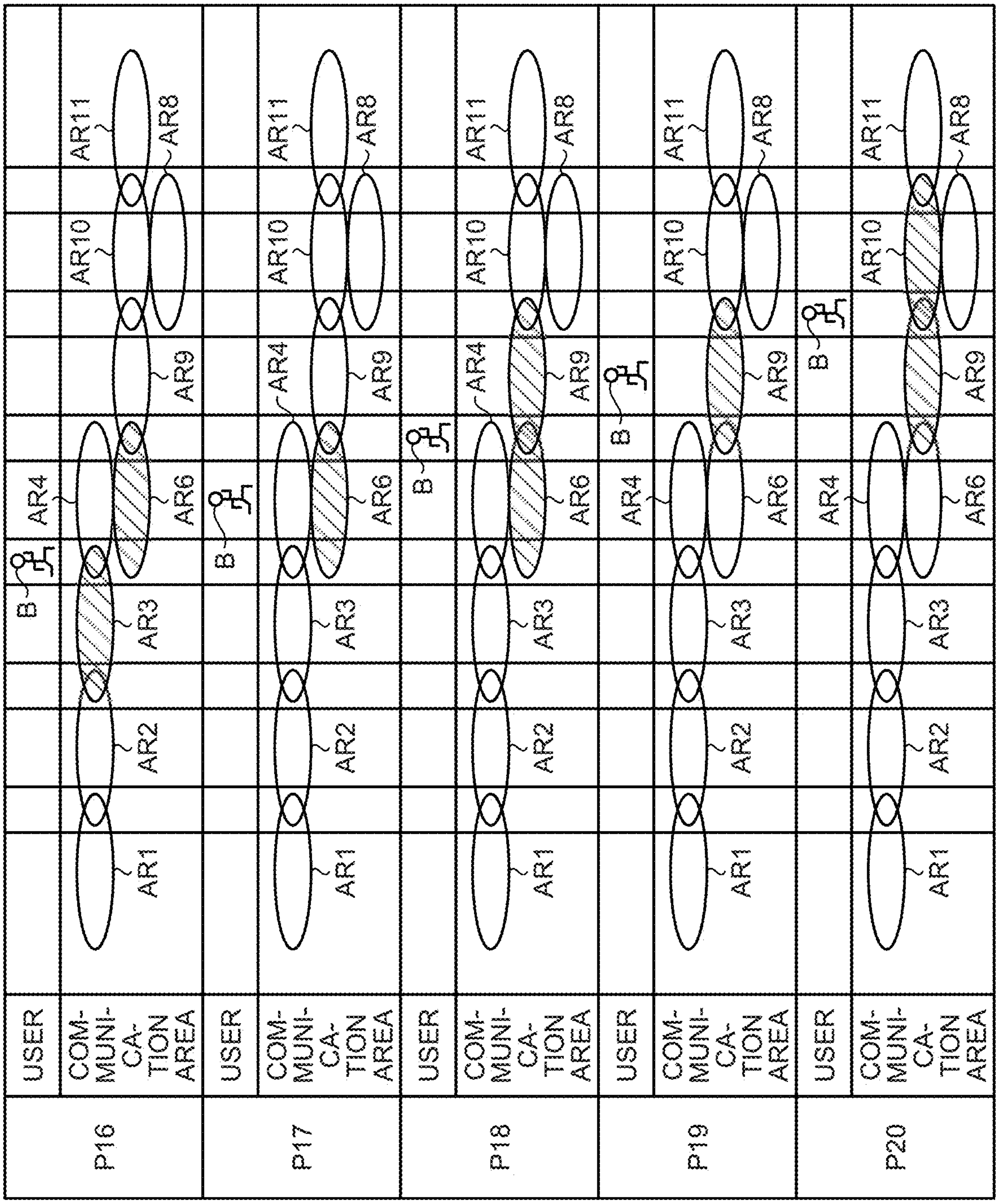
FIG. 12 is a diagram illustrating the other example of communication areas through which the user guided through the route moves.
Figure 13:
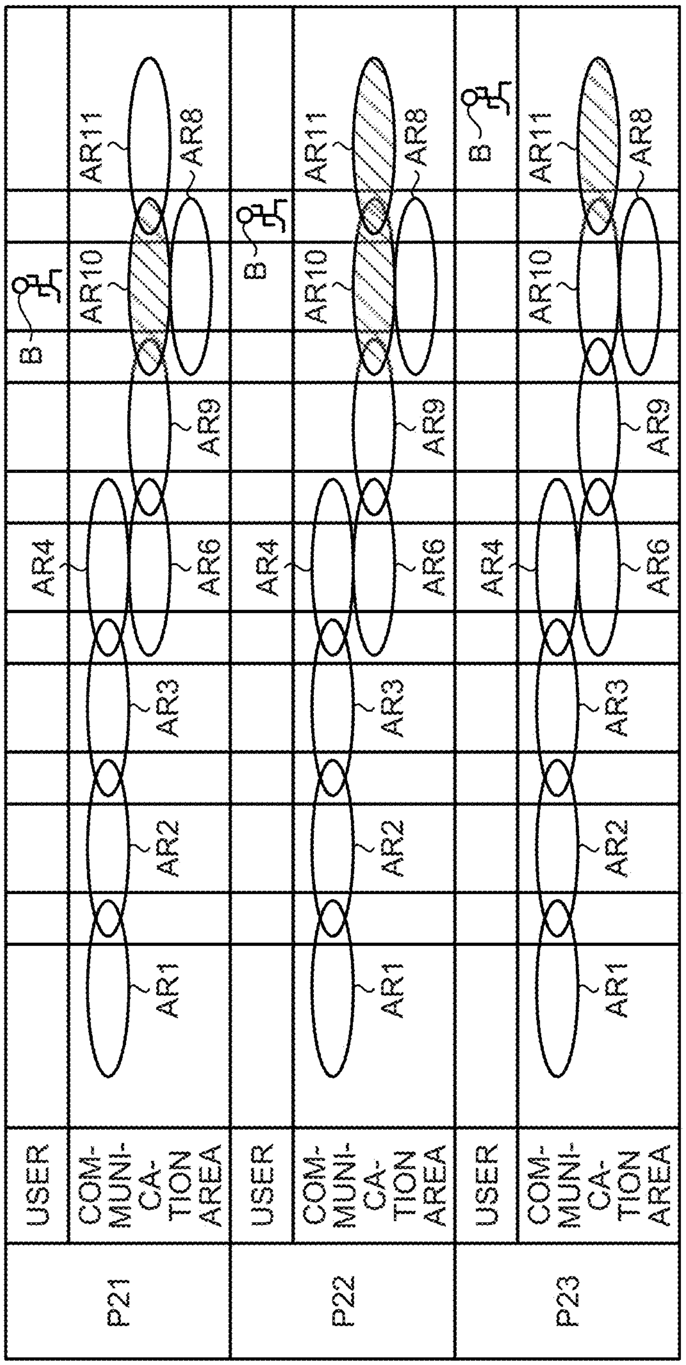
FIG. 13 is a diagram illustrating the other example of communication areas through which the user guided through the route moves.

FIGS. 11 to 13 are diagrams illustrating other example of communication areas through which a user guided through a route moves. FIGS. 11 to 13 illustrate the relation between the position of the user B and communication areas in the states P11 to P23. In FIGS. 11 to 13, a hatched communication area indicates that light is emitted by an illumination device corresponding to the communication area.

In FIG. 11, the states P11 to P15 are the same as the states P1 to P5 in FIG. 9. In the state P11, the illumination device 100-1 corresponding to the communication area AR1 emits light. In the state P12, the illumination devices 100-1 and 100-2 corresponding to the communication areas AR1 and AR2 emit light. In the state P13, the illumination device 100-2 corresponding to the communication area AR2 emits light. In the state P14, the illumination devices 100-2 and 100-3 corresponding to the communication areas AR2 and AR3 emit light. In the state P15, the illumination device 100-3 corresponding to the communication area AR3 emits light.

In FIG. 12, the state P16 indicates that the user B is positioned in the communication area AR3 and the communication area AR6. The illumination device 100-3 corresponding to the communication area AR3 emits light as in the state P15. Simultaneously, the illumination device 100-6 corresponding to the communication area AR6 detects that the mobile terminal device 500 that the user B has is positioned in the communication area AR6. Accordingly, the illumination device 100-6 corresponding to the communication area AR6 emits light.

The state P16 indicates that the user B is positioned also in the communication area AR4. The illumination device 100-4 corresponding to the communication area AR4 detects that the mobile terminal device 500 that the user B has is positioned in the communication area AR4. However, the illumination device 100-4 is not positioned in a direction in which the user B proceeds, and accordingly, does not emit light.

The state P17 indicates that the user B is positioned in the communication area AR6. The illumination device 100-6 corresponding to the communication area AR6 emits light as in the state P16.

The state P18 indicates that the user B is positioned in the communication area AR6 and the communication area AR9. The illumination device 100-6 corresponding to the communication area AR6 emits light as in the state P17. Simultaneously, the illumination device 100-9 corresponding to the communication area AR9 detects that the mobile terminal device 500 that the user B has is positioned in the communication area AR9. Accordingly, the illumination device 100-9 corresponding to the communication area AR9 emits light.

The state P19 indicates that the user B is positioned in the communication area AR9. The illumination device 100-9 corresponding to the communication area AR9 emits light as in the state P18.

The state P20 indicates that the user B is positioned in the communication area AR9 and the communication area AR10. The illumination device 100-9 corresponding to the communication area AR9 emits light as in the state P19. Simultaneously, the illumination device 100-10 corresponding to the communication area AR10 detects that the mobile terminal device 500 that the user B has is positioned in the communication area AR10. Accordingly, the illumination device 100-10 corresponding to the communication area AR10 emits light.

The state P20 indicates that the user B is positioned also in the communication area AR8. The illumination device 100-8 corresponding to the communication area AR8 detects that the mobile terminal device 500 that the user B has is positioned in the communication area AR8. However, the illumination device 100-8 is not positioned in a direction in which the user B proceeds, and accordingly, does not emit light.

In FIG. 13, the state P21 indicates that the user B is positioned in the communication area AR10. The illumination device 100-10 corresponding to the communication area AR10 emits light as in the state P20.

The state P22 indicates that the user B is positioned in the communication area AR10 and the communication area AR11. The illumination device 100-10 corresponding to the communication area AR10 emits light as in the state P21. Simultaneously, the illumination device 100-11 corresponding to the communication area AR11 detects that the mobile terminal device 500 that the user B has is positioned in the communication area AR11. Accordingly, the illumination device 100-11 corresponding to the communication area AR11 emits light.

The state P23 indicates that the user B is positioned in the communication area AR11. The illumination device 100-11 corresponding to the communication area AR11 emits light as in the state P22.

As in the above-described states P11 to P23, for the user B, light is sequentially emitted by the illumination devices 100-1 to 100-3, 100-6, and 100-9 to 100-11. The user B can be guided through a route with light irradiation by the illumination devices 100-1 to 100-3, 100-6, and 100-9 to 100-11.

Examples of Shape and Size of Emitted Light

Figure 14:
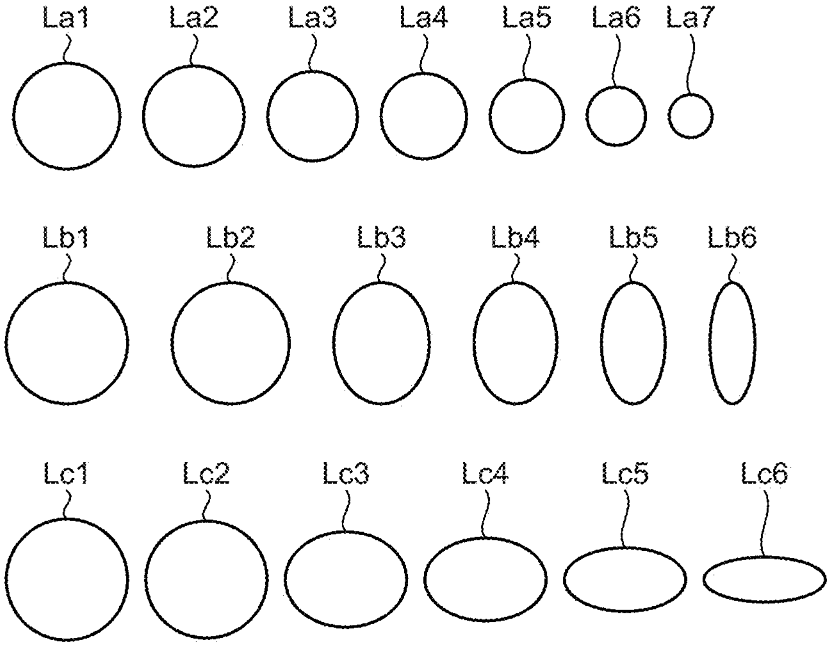
FIG. 14 is a diagram illustrating examples of the shape and size of light emitted by each illumination device.

FIG. 14 is a diagram illustrating examples of the shape and size of light emitted by each illumination device 100. As described later, the light irradiator 13 in each of the illumination devices 100-1 to 100-11 can change the size and shape of light with which the floor surface of the path 200 is irradiated. For example, the size of light in a perfectly circular shape can be changed. In the present example, light La1, light La2, light La3, light La4, light La5, light La6, and light La7 are larger in the stated order.

The light irradiator 13 can change the shape of emitted light into a vertically long elliptical shape. For example, lights Lb1 to Lb6 are lights in vertically long elliptical shapes. In addition, the light irradiator 13 can change the size of light in a vertically long elliptical shape. In the present example, the light Lb1, the light Lb2, the light Lb3, the light Lb4, the light Lb5, and the light Lb6 are larger in the stated order.

The light irradiator 13 can also change the shape of emitted light into a horizontally long elliptical shape. For example, lights Lc1 to Lc6 are lights in horizontally long elliptical shapes. The light irradiator 13 can also change the size of light in a horizontally long elliptical shape. In the present example, the light Lc1, the light Lc2, the light Lc3, the light Lc4, the light Lc5, and the light Lc6 are larger in the stated order.

Figure 15:
FIG. 15 is a diagram illustrating other examples of the shape of light emitted by each illumination device.

FIG. 15 is a diagram illustrating other examples of the shape of light emitted by each illumination device 100. In FIG. 15, light Ld is light in a shape obtained by placing over a vertically long elliptical shape and a horizontally long elliptical shape. The light Ld is light in a shape obtained by placing over a vertically long elliptical shape and a horizontally long elliptical shape with their centers aligned. Similarly, light Le is light in a shape obtained by placing over a vertically long elliptical shape and a horizontally long elliptical shape. The light Le is light in a shape obtained by placing over a vertically long elliptical shape and a horizontally long elliptical shape with their centers not aligned. The light irradiator 13 can change shape like the light Ld and the light Le. The user may be guided by emitting the light Ld and the light Le. For example, availability of three options of the proceeding direction can be indicated by emitting the light Ld. Specifically, in a case where the user is proceeding from the right side in the drawing, the light Ld can be emitted when the user can select any of proceeding straight, turning right, and turning left. Moreover, for example, availability of two options of the proceeding direction can be indicated by emitting the light Le. Specifically, in a case where the user is proceeding from the right side in the drawing, the light Le can be emitted when the user can select any of proceeding straight and turning right.

Operation of Control Device

Figure 16:
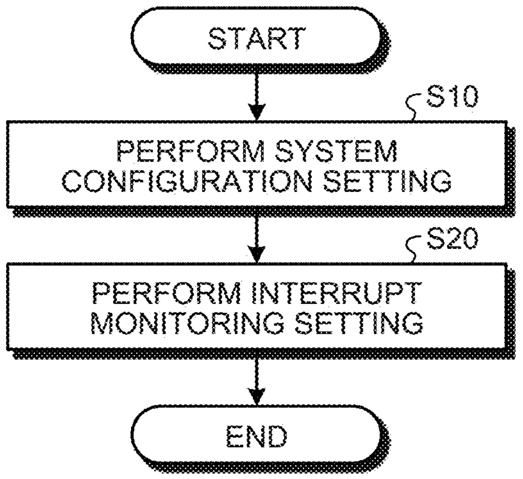
FIG. 16 is a flowchart illustrating exemplary processing by a controller in a control device of each illumination system.
Figure 17:
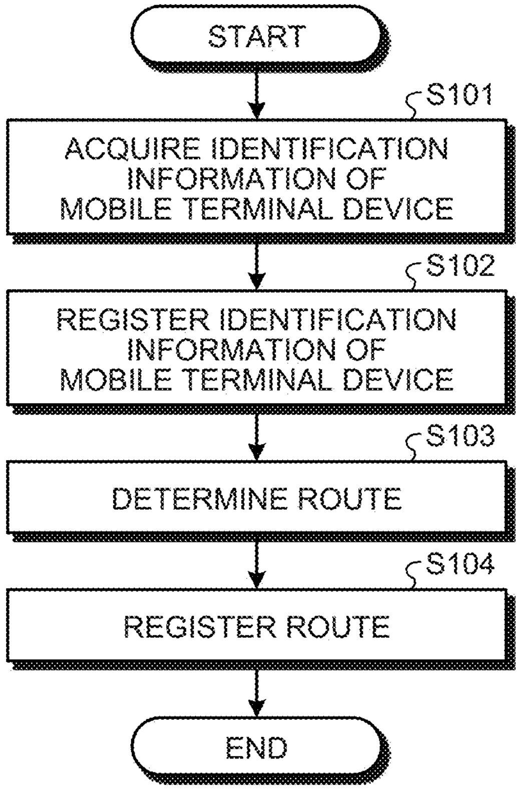
FIG. 17 is a flowchart illustrating exemplary processing by the controller in the control device of each illumination system.

FIGS. 16 and 17 are flowcharts illustrating exemplary processing by the controller 43 in the control device 400 of the illumination system 1000. FIG. 16 illustrates an example of processing related to initial setting of interrupt information. In FIG. 16, first, the controller 43 performs system configuration setting processing (step S10). The system configuration setting processing is processing of acquiring data that identifies each illumination device included in the illumination system 1000 and storing the data in the storage 41. In the present example, data that identifies the illumination devices 100-1 to 100-11 is acquired from the illumination devices 100-1 to 100-11, respectively, and stored in the storage 41.

Subsequently, the controller 43 performs interrupt monitoring setting processing (step S20). The interrupt monitoring setting processing is processing of setting interrupt targets for the illumination devices 100-1 to 100-11. The interrupt targets set by the processing are monitoring targets. For example, in a case where a beacon and a smartphone are set as monitoring targets, interrupt occurs when any of them enters a communication area.

Alternatively, for example, a smartphone may be set as a monitoring target and a beacon may be not set as a monitoring target. In this case, interrupt occurs when a smartphone enters a communication area. However, in this case, no interrupt occurs when a beacon enters a communication area.

FIG. 17 illustrates an example of processing of registering a mobile terminal device and a route through which a user with the mobile terminal device is to be guided. In FIG. 17, first, the controller 43 acquires identification information of the mobile terminal device (step S101). For example, an administrator of the illumination system 1000 inputs the identification information of the mobile terminal device, and accordingly, the controller 43 can acquire the identification information of the mobile terminal device. The controller 43 stores the identification information of the mobile terminal device in the storage 41 in the control device 400 (step S102). Thus, registration of the identification information of the mobile terminal device is completed.

Subsequently, the route through which the user is to be guided is determined (step S103). Specifically, the route through which the user with the mobile terminal device corresponding to the identification information, registration of which is completed at step S202 is to be guided is determined. For example, the administrator of the illumination system 1000 inputs identification information of the route, and accordingly, the route through which the user is to be guided is determined. The controller 43 stores the determined route in the storage 41 in the control device 400 (step S104). Thus, registration of the route is completed.

Operation of Illumination Device

Figure 18:
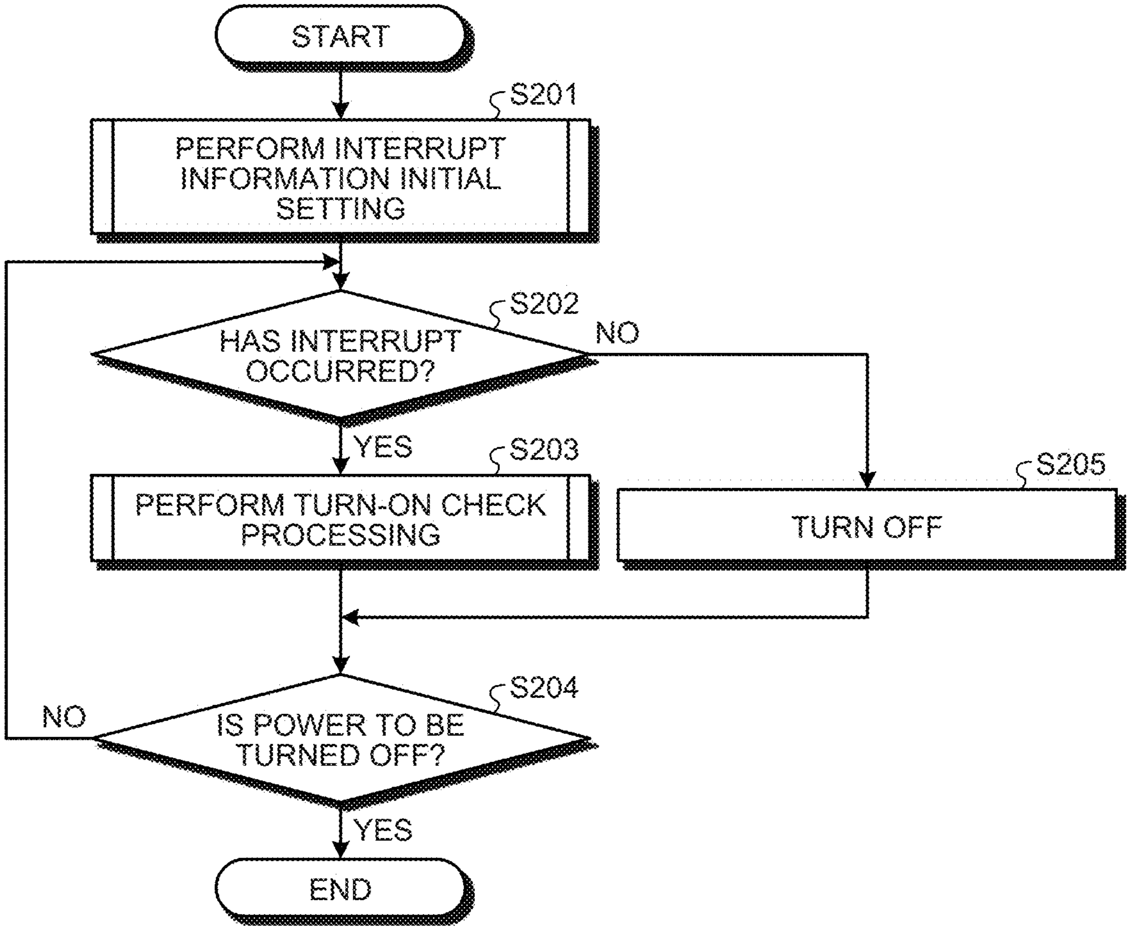
FIG. 18 is a flowchart illustrating exemplary processing by the controller of each illumination device.
Figure 19:
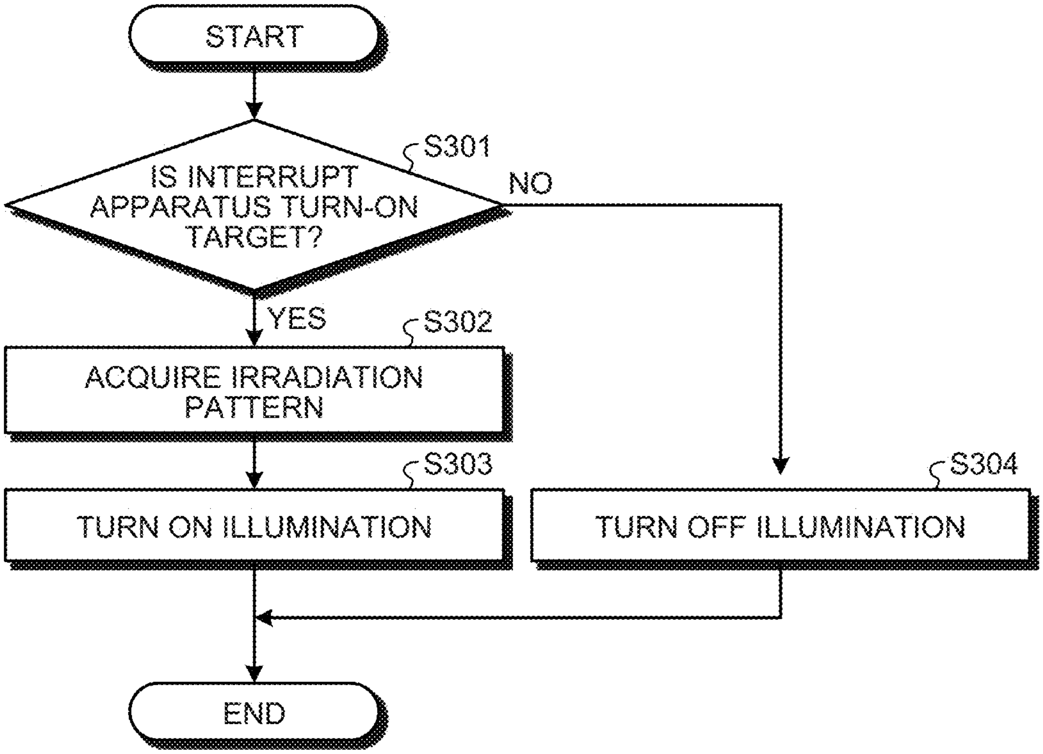
FIG. 19 is a flowchart illustrating an example of turn-on check processing by the controller of each illumination device.

FIGS. 18 and 19 are flowcharts illustrating exemplary processing by the controller 12 of each illumination device 100.

In FIG. 18, the controller 12 first performs interrupt information initial setting (step S201). The interrupt information initial setting is processing corresponding to the processing described above with reference to FIGS. 16 and 17.

After the interrupt information initial setting is completed, the controller 12 determines whether interrupt has occurred from a smartphone or the like (step S202). In a case where interrupt has occurred as a result of the determination at step S202 (Yes at step S202), the controller 12 performs turn-on check processing (step S203). The turn-on check processing is processing of checking an interrupt target and turning on the light irradiator 13. Details of the turn-on check processing will be described later. After having performed the turn-on check processing (step S203), the controller 12 determines whether power is to be turned off (step S204). In a case where power is to be turned off as a result of the determination at step S204 (Yes at step S204), the processing ends.

In a case where power is not to be turned off as a result of the determination at step S204 (No at step S204), the controller 12 returns to step S202 and continues the processing.

In a case where interrupt has not occurred as a result of the determination at step S202 (No at step S202), the light irradiator 13 is turned off (step S205). Thereafter, the controller 12 determines whether power is to be turned off (step S204). In a case where power is to be turned off as a result of the determination at step S204 (Yes at step S204), the processing ends.

FIG. 19 is a flowchart illustrating an example of turn-on check processing by the controller 12 of each illumination device 100. The processing corresponds to the turn-on check processing at step S203 in FIG. 18.

As illustrated in FIG. 19, the controller 12 first determines whether an interrupt apparatus is a turn-on target (step S301). In a case where the interrupt apparatus is a turn-on target as a result of the determination at step S301 (Yes at step S301), the controller 12 acquires data related to an irradiation pattern indicating the size and shape of light to be emitted (step S302). The controller 12 turns on illumination based on the irradiation pattern of the acquired data (step S303). Specifically, the controller 12 controls the light irradiator 13 to emit light in the irradiation pattern. Thus, the light irradiator 13 emits light based on the data related to the irradiation pattern.

In a case where the interrupt apparatus is not a turn-on target as a result of the determination at step S301 (No at step S301), the controller 12 turns off illumination (step S304). Specifically, the controller 12 controls the light irradiator 13 not to emit light.

Another Exemplary Configuration of Illumination System

Figure 20:
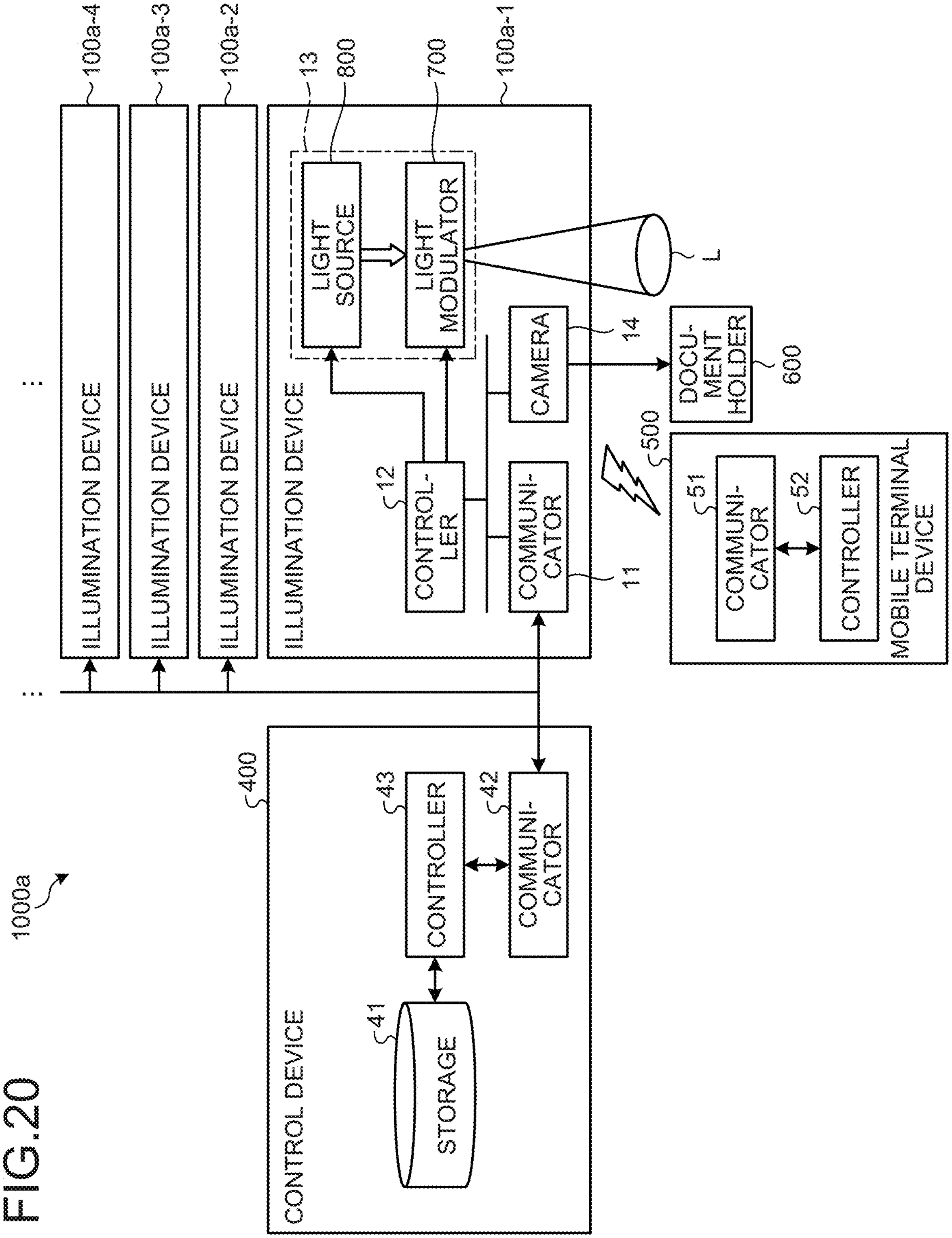
FIG. 20 is a diagram illustrating another exemplary configuration of an illumination system including illumination devices according to the present embodiment.

FIG. 20 is a diagram illustrating another exemplary configuration of an illumination system including illumination devices according to the present embodiment.

In FIG. 20, an illumination system 1000*a* includes a plurality of illumination devices 100*a*-1, 100*a*-2, 100*a*-3, 100*a*-4, . . . and the control device 400. The illumination devices 100*a*-1, 100*a*-2, 100*a*-3, 100*a*-4, . . . are provided at intervals.

The illumination device 100*a*-1 has the same configuration as the other illumination devices 100*a*-2, 100*a*-3, 100*a*-4, . . . . Thus, the following description will be made with the configuration of the illumination device 100*a*-1 as a representative. As illustrated in FIG. 20, the illumination device 100*a*-1 has a configuration with a camera 14 in addition to the illumination device 100-1 in FIG. 1. In this case, at step S20 in FIG. 16, the camera 14 is set as an interrupt target. For example, interrupt is generated when a color different from colors included in an image of the floor surface is obtained from an image of the camera 14.

The camera 14 acquires an image of belongings of a user. For example, the camera 14 acquires an image of a document holder 600 that the user has. Thus, data related to the color of the document holder 600 is obtained. The user can be guided based on the obtained data. The color of emitted light may be changed depending on a person. In this case, light sources 800 corresponding to a plurality of kinds of colors may be prepared and a light source 800 that emits light may be selected based on the data obtained by the camera 14. Note that the color of this light does not need to be identical to the color (of the document holder) detected by the camera.

The camera 14 may acquire an image of belongings of the user other than the document holder 600. For example, the color of a headwear (not illustrated) that the user wears, the color of a helmet (not illustrated) that the user wears, or the color of cloth (not illustrated) that the user wears may be acquired and the user may be guided through a route based on the color.

Figure 21:
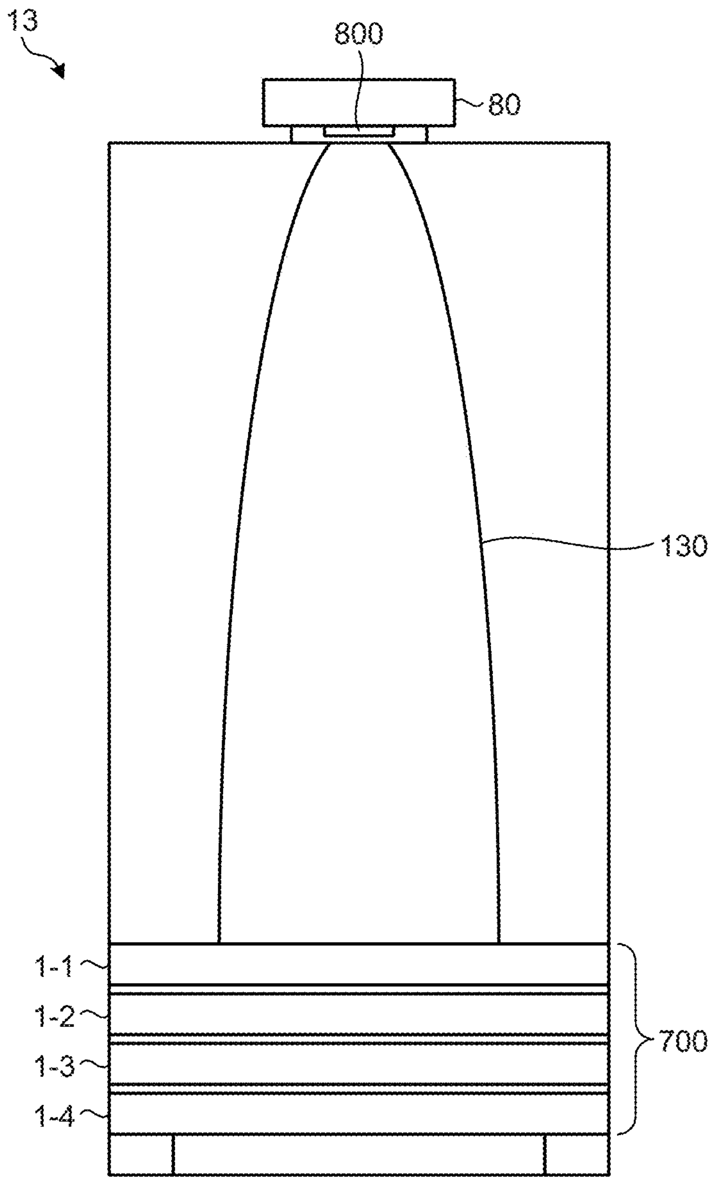
FIG. 21 is a diagram illustrating an exemplary configuration of a light irradiator of each illumination device.

FIG. 21 is a diagram illustrating an exemplary configuration of the light irradiator 13 of each illumination device 100. FIG. 21 is a diagram illustrating a section along a plane passing through the central axis of light emitted by the light irradiator 13. As illustrated in FIG. 21, the light irradiator 13 includes a light source unit 80, a reflection plate 130, and the light modulator 700.

The light source unit 80 includes a light source 800. The light source 800 is, for example, an LED mounted on a substrate of the light source unit 80.

The reflection plate 130 has a curved surface that reflects light output from the light source 800. The light reflected by the reflection plate 130 is incident on the light modulator 700. The light modulator 700 emits the light from a surface opposite a surface on which the light is incident. The emitted light is incident on, for example, a floor surface. The light modulator 700 includes four light modulation panels 1-1 to 1-4. The four light modulation panels 1-1 to 1-4 have the same configuration. The four light modulation panels 1-1 to 1-4 can change the shape and size of incident light. The light modulation panels 1-1 to 1-4 deform the light from the light source 800 into an elliptical shape, for example.

In the present example, the light modulation panel 1-1 and the light modulation panel 1-2 are stacked. The light modulation panel 1-1 is a light modulation panel for p-wave polarization. The light modulation panel 1-2 is a light modulation panel for s-wave polarization. Flexible light modulation control is possible by providing signals based on light to be emitted to the light modulation panel 1-1 and the light modulation panel 1-2. Note that the light modulation panel 1-1 may be a light modulation panel for s-wave polarization and the light modulation panel 1-2 may be a light modulation panel for p-wave polarization. It is only required that any one of the light modulation panel 1-1 and the light modulation panel 1-2 is a light modulation panel for p-wave polarization and the other is a light modulation panel for s-wave polarization.

In the present example, the light modulation panel 1-3 and the light modulation panel 1-4 are stacked. The light modulation panel 1-3 is a light modulation panel for p-wave polarization. The light modulation panel 1-4 is a light modulation panel for s-wave polarization. Flexible light modulation control is possible by providing signals based on light to be emitted to the light modulation panel 1-3 and the light modulation panel 1-3. Note that the light modulation panel 1-3 may be a light modulation panel for s-wave polarization and the light modulation panel 1-4 may be a light modulation panel for p-wave polarization. It is only required that any one of the light modulation panel 1-3 and the light modulation panel 1-4 is a light modulation panel for p-wave polarization and the other is a light modulation panel for s-wave polarization.

Accordingly, the four light modulation panels 1-1 to 1-4 have a configuration including two liquid crystal cells for p-wave polarization and two liquid crystal cells for s-wave polarization. More flexible light modulation control is possible with this configuration. Specifically, the size and shape of emitted light can be changed as described above with reference to FIGS. 14 and 15.

Figure 22:
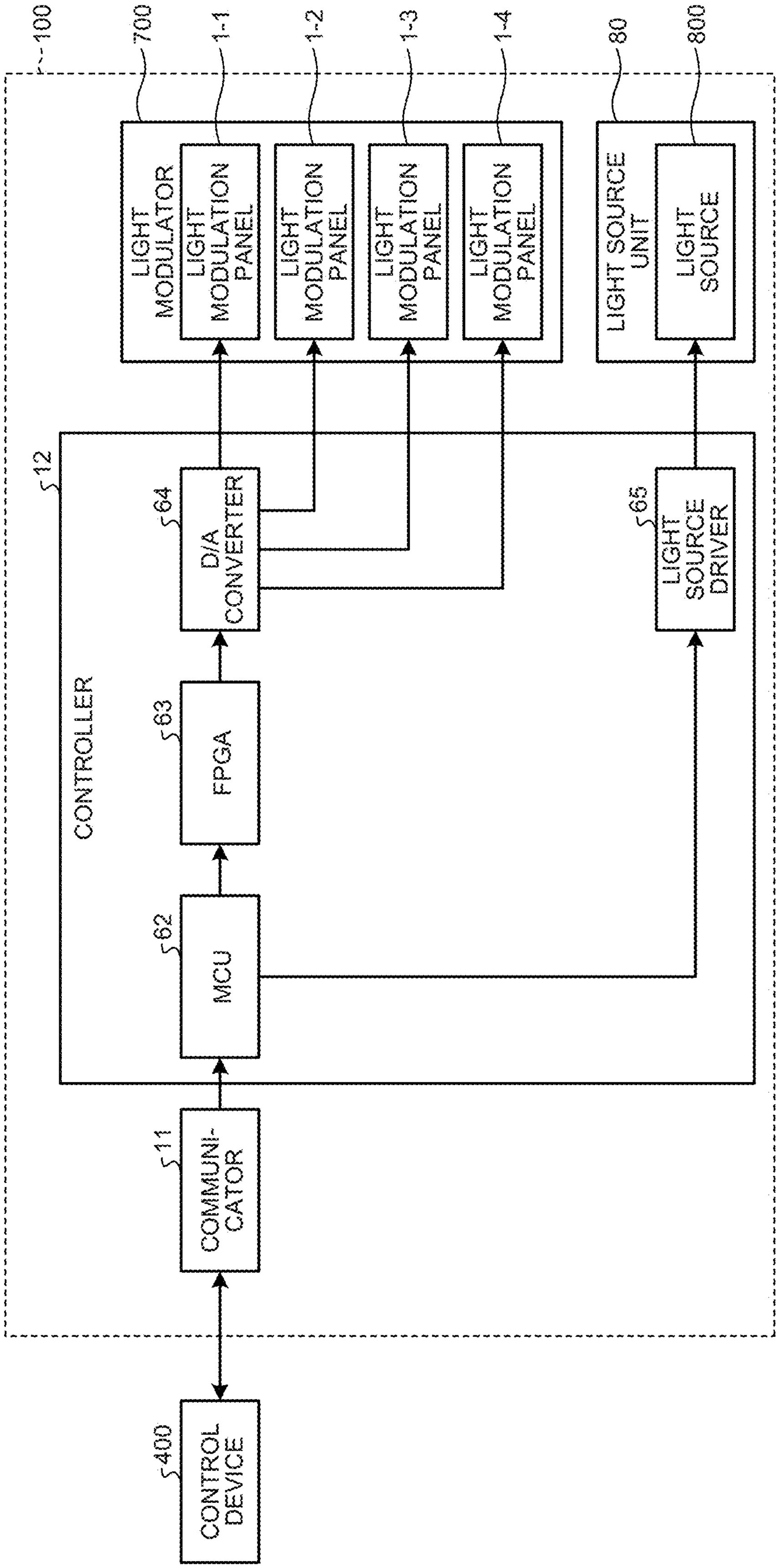
FIG. 22 is a block diagram illustrating a main configuration of a controller and the relation among components included in the controller, a light source unit, and a sensor unit.

FIG. 22 is a block diagram illustrating an exemplary configuration of the controller 12. The controller 12 includes a micro controller unit (MCU) 62, a field programmable gate array (FPGA) 63, a digital-analog (D/A) converter 64, and a light source driver 65. The controller 12 is coupled to the communicator 11.

The communicator 11 performs communication with the control device 400. Specifically, the communicator 11 includes, for example, a circuit that functions as a network interface controller (NIC). The communicator 11 receives a signal transmitted from the control device 400 and including a command related to operation of the illumination device 100 and outputs information indicating the command to the MCU 62.

The command related to operation of the illumination device 100 and transmitted from the control device 400 is a command that designates on/off of light irradiation by the illumination device 100, the shape and size of light, the intensity of light, and the like, but is not limited thereto and may include any matter that can be individually designated in an operation control range of the illumination device 100.

The MCU 62 outputs various signals to the FPGA 63 and the light source driver 65 in accordance with the command related to operation of the illumination device 100 and obtained from the control device 400 through the communicator 11. In other words, the MCU 62 controls each component of the controller 12 so that the illumination device 100 operates in accordance with operation from the control device 400.

Under control by the MCU 62, the FPGA 63 performs information processing for controlling operation of the light modulator 700 and outputs a signal indicating a result of the information processing to the D/A converter 64. For example, in a case where designation related to a light irradiation area is included in the command related to operation of the illumination device 100 and transmitted from the control device 400, the FPGA 63 performs information processing for operating the light modulator 700 so that the irradiation area corresponding to the designation is irradiated with light.

The D/A converter 64 has a configuration that outputs, based on a digital signal that is a signal from the FPGA 63, an analog signal for operating the light modulation panels 1 included in the light modulator 700. The configuration may be one circuit or may include a plurality of circuits.

The light source driver 65 is a controller that performs, under control by the MCU 62, on/off control of the light source 800 included in the light source unit 80 and light emission intensity control when the light source 800 is on. The controller may be one circuit or may include a plurality of circuits.

Each light modulation panel 1 included in the light modulator 700 will be described below with reference to FIGS. 23 to 27.

Figure 23:
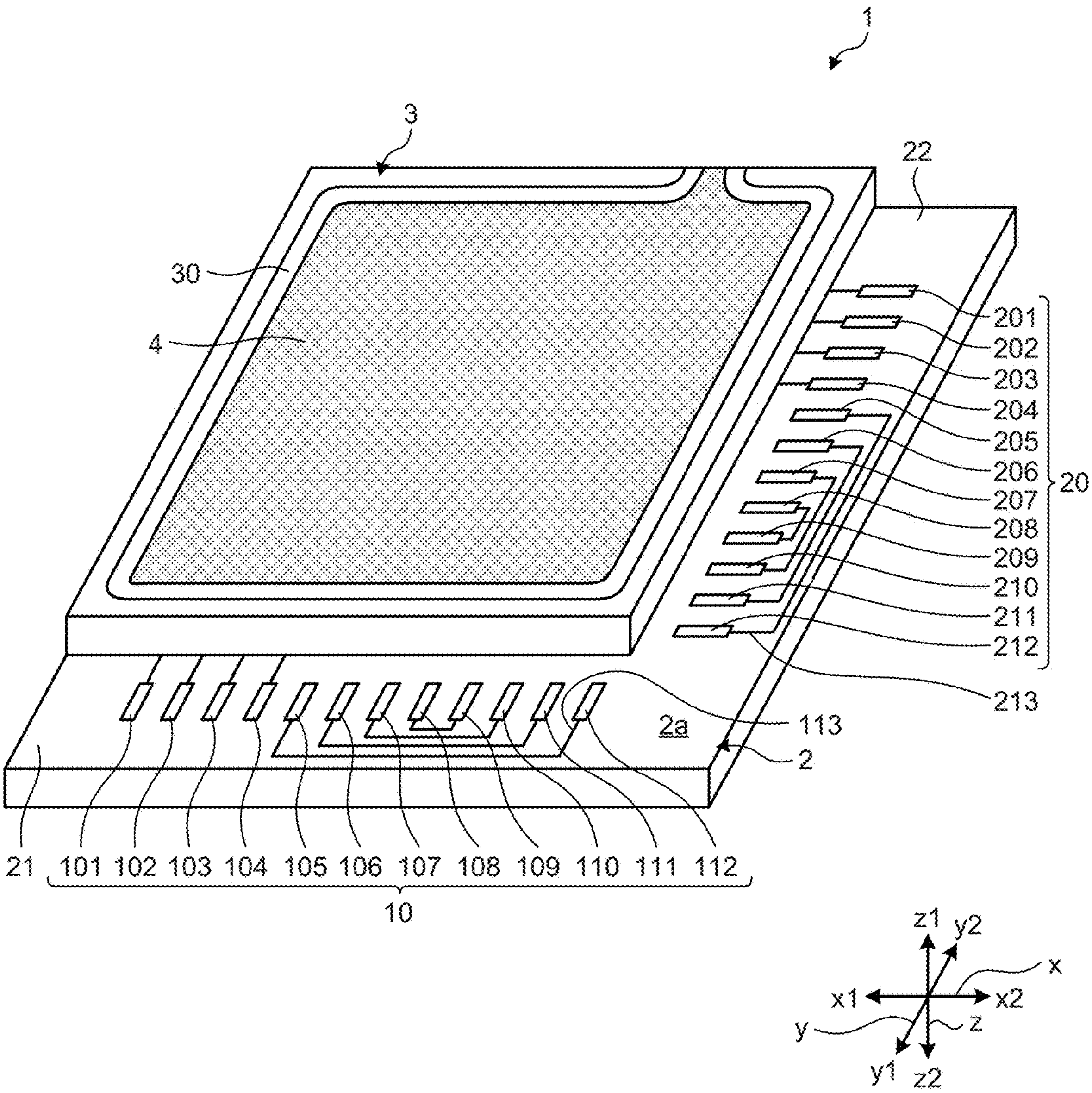
FIG. 23 is a perspective view of a light modulation panel according to the embodiment.
Figure 24:
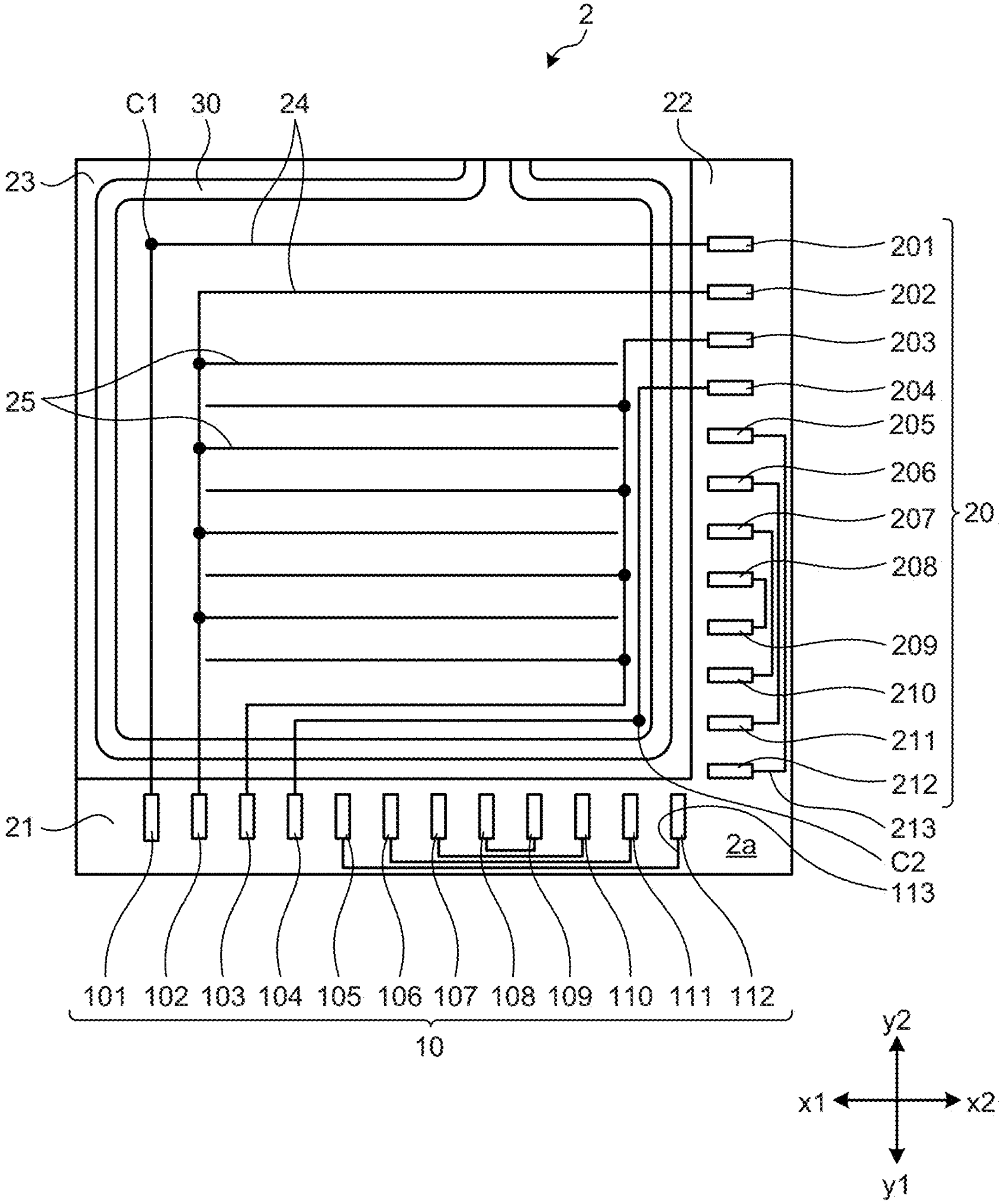
FIG. 24 is a plan view illustrating wiring of an array substrate of the light modulation panel according to the embodiment when viewed from above.
Figure 25:
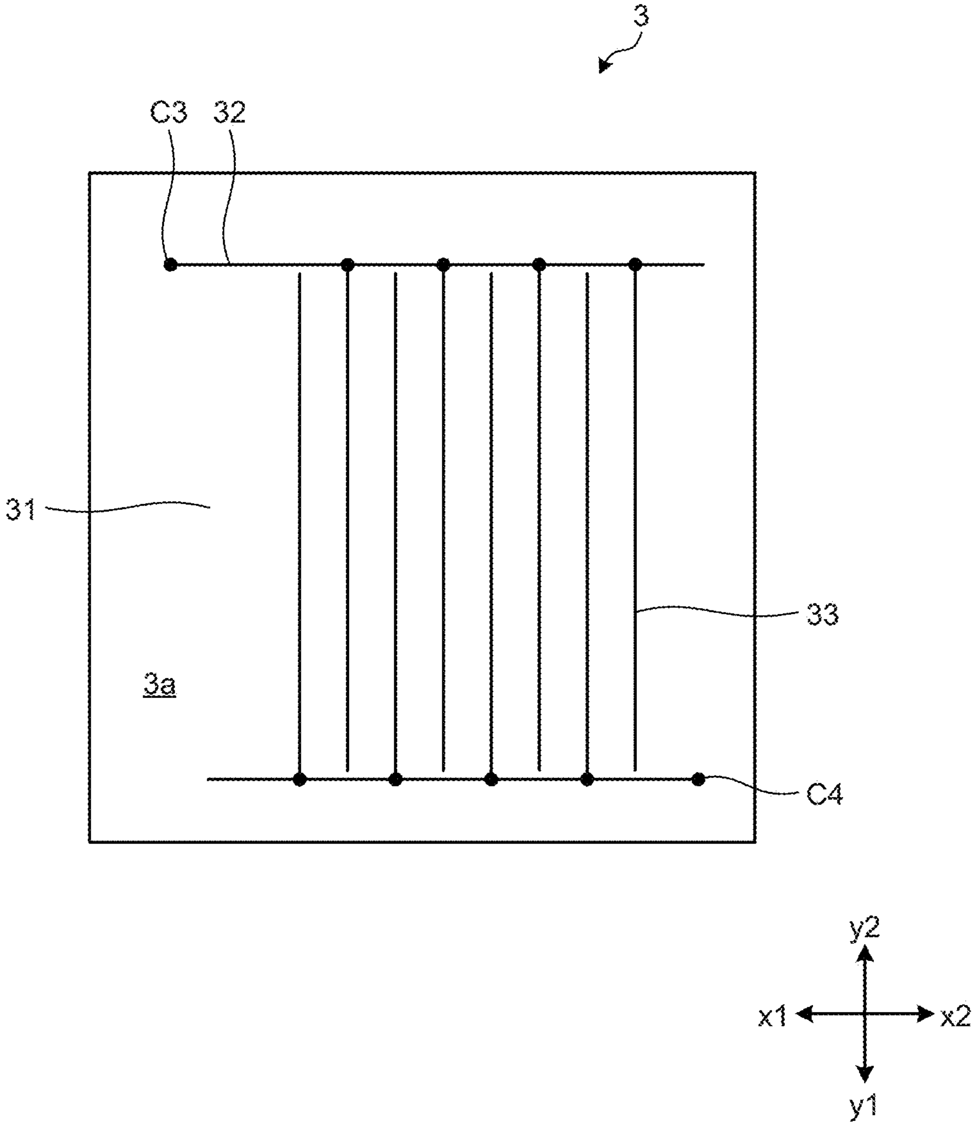
FIG. 25 is a plan view illustrating wiring of a counter substrate of the light modulation panel according to the embodiment when viewed from above.
Figure 26:
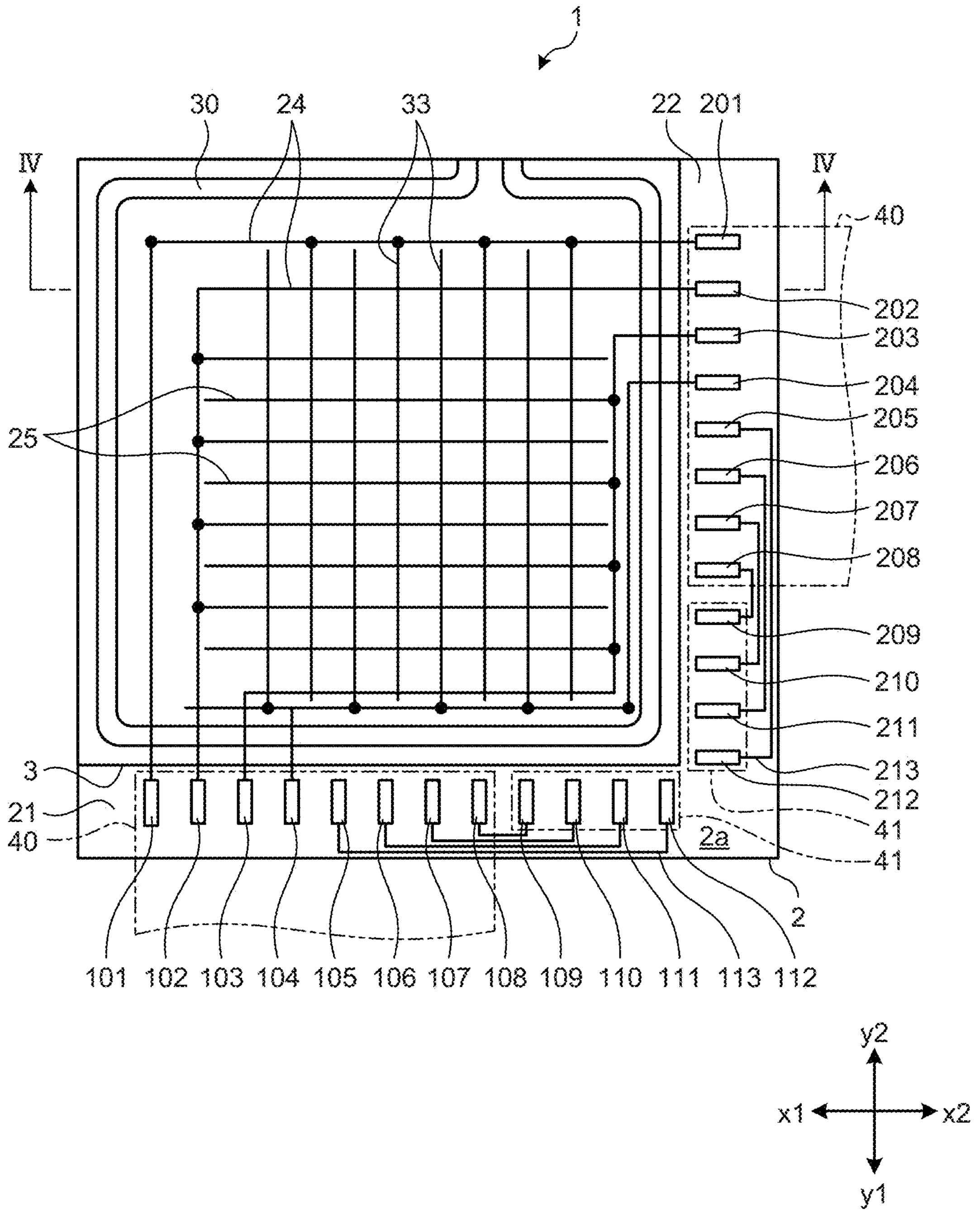
FIG. 26 is a plan view illustrating wiring of the light modulation panel according to the embodiment when viewed from above.
Figure 27:
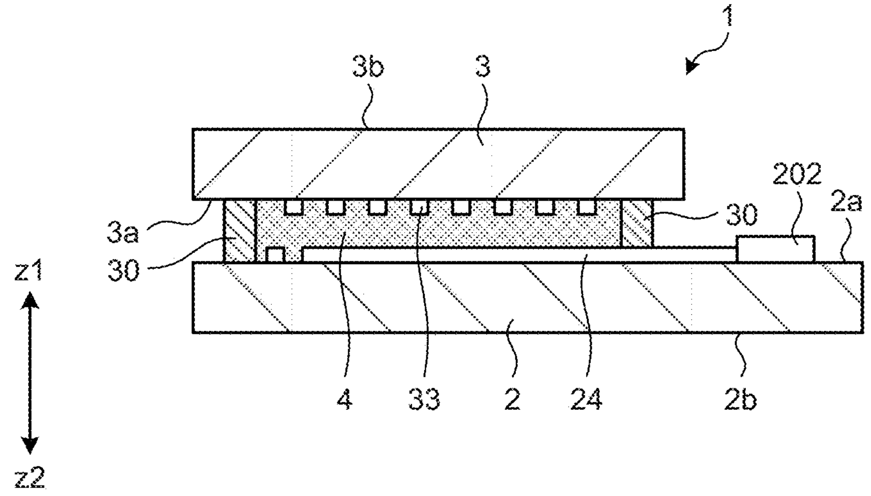
FIG. 27 is a sectional view taken along line IV-IV in FIG. 26.

FIG. 23 is a perspective view of a light modulation panel according to an embodiment. FIG. 24 is a plan view illustrating wiring of an array substrate of the light modulation panel according to the embodiment when viewed from above. FIG. 25 is a plan view illustrating wiring of a counter substrate of the light modulation panel according to the embodiment when viewed from above. FIG. 26 is a plan view illustrating wiring of the light modulation panel according to the embodiment when viewed from above. FIG. 27 is a sectional view taken along line IV-IV in FIG. 26. Note that, in an xyz coordinate system illustrated in FIGS. 23 to 26, a direction along an x1 direction and an x2 direction is referred to as an x direction. The x1 direction is opposite the x2 direction. A direction along a y1 direction and a y2 direction is referred to as a y direction. The y1 direction is opposite the y2 direction. A direction along a z1 direction and a z2 direction is referred to as a z direction. The z1 direction is opposite the z2 direction. The x direction is orthogonal to the y direction. A plane including the x direction and the y direction is orthogonal to the z direction.

As illustrated in FIG. 23, each light modulation panel 1 includes an array substrate 2, a counter substrate 3, a liquid crystal layer 4, and a seal material 30.

As illustrated in FIGS. 23 and 26, the array substrate (first substrate) 2 is larger than the counter substrate (second substrate) 3. In other words, the area of the counter substrate (second substrate) 3 is smaller than the area of the array substrate (first substrate) 2. The array substrate 2 includes a transparent glass 23 (refer to FIG. 24). The counter substrate 3 includes a transparent glass 31 (refer to FIG. 25). In the embodiment, the array substrate 2 and the counter substrate 3 have square shapes in a plan view from above, but the shape of each substrate according to the present disclosure is not limited to a square shape. A first terminal group area 21 and a second terminal group area 22 are provided on a front surface 2*a* of the array substrate 2. The first terminal group area 21 is positioned at an end part of the front surface 2*a* of the array substrate 2 on the y1 side. The second terminal group area 22 is positioned at an end part of the front surface 2*a* of the array substrate 2 on the x2 side. The first terminal group area 21 and the second terminal group area 22 have L shapes when viewed from above. A first terminal group 10 is disposed in the first terminal group area 21, and a second terminal group 20 is disposed in the second terminal group area 22. Note that since the area of the counter substrate 3 is smaller than the area of the array substrate 2, the first terminal group 10 and the second terminal group 20 are exposed. The first terminal group 10 and the second terminal group 20 are also simply referred to as terminal portions.

As illustrated in FIGS. 23 and 26, the first terminal group 10 includes a first terminal 101, a second terminal 102, a third terminal 103, a fourth terminal 104, a first pad 105, a second pad 106, a third pad 107, a fourth pad 108, a fifth pad 109, a sixth pad 110, a seventh pad 111, and an eighth pad 112. The first terminal 101, the second terminal 102, the third terminal 103, the fourth terminal 104, the first pad 105, the second pad 106, the third pad 107, the fourth pad 108, the fifth pad 109, the sixth pad 110, the seventh pad 111, and the eighth pad 112 are sequentially arranged a right-left direction from the x1 side toward the x2 side. The first pad 105 and the eighth pad 112 are electrically coupled to each other through a lead line 113. The second pad 106 and the seventh pad 111 are electrically coupled to each other through a lead line 113. The third pad 107 and the sixth pad 110 are electrically coupled to each other through a lead line 113. The fourth pad 108 and the fifth pad 109 are electrically coupled to each other through a lead line 113.

As illustrated in FIGS. 23 and 26, the second terminal group 20 includes a fifth terminal 201, a sixth terminal 202, a seventh terminal 203, an eighth terminal 204, a ninth pad 205, a tenth pad 206, an eleventh pad 207, a twelfth pad 208, a thirteenth pad 209, a fourteenth pad 210, a fifteenth pad 211, and a sixteenth pad 212. The fifth terminal 201, the sixth terminal 202, the seventh terminal 203, the eighth terminal 204, the ninth pad 205, the tenth pad 206, the eleventh pad 207, the twelfth pad 208, the thirteenth pad 209, the fourteenth pad 210, the fifteenth pad 211, and the sixteenth pad 212 are sequentially arranged in a front-back direction from the y2 side toward the y1 side. The ninth pad 205 and the sixteenth pad 212 are electrically coupled to each other through a lead line 213. The tenth pad 206 and the fifteenth pad 211 are electrically coupled to each other through a lead line 213. The eleventh pad 207 and the fourteenth pad 210 are electrically coupled to each other through a lead line 213. The twelfth pad 208 and the thirteenth pad 209 are electrically coupled to each other through a lead line 213.

Note that, as illustrated in FIG. 23, the counter substrate 3 is disposed on an upper side (z1 side) relative to the array substrate 2. The seal material 30 and the liquid crystal layer 4 are provided between the counter substrate 3 and the array substrate 2. The seal material 30 is provided in an annular shape along the outer periphery of the counter substrate 3 and the inside of the seal material 30 is filled with the liquid crystal layer 4. Note that a region in which the liquid crystal layer 4 is provided is an active region, the outside of the liquid crystal layer 4 is a frame region, and the first terminal group area 21 and the second terminal group area 22 are terminal regions.

The following describes wires on the array substrate 2 and the counter substrate 3. Note that, as illustrated in FIG. 27, wiring is provided on a front surface among the front and back surfaces of each substrate. In other words, a surface on which wires are provided is referred to as the front surface, and a surface opposite to the front surface is referred to as the back surface. Specifically, as illustrated in FIG. 27, wiring is provided on the front surface 2*a* on the upper side among the front surface 2*a* and a back surface 2*b* of the array substrate 2, and wiring is provided on the front surface 3*a* on the lower side among a front surface 3*a* and a back surface 3*b* of the counter substrate 3. In this manner, the front surface 2*a* of the array substrate 2 and the front surface 3*a* of the counter substrate 3 are disposed facing each other with the liquid crystal layer 4 interposed therebetween.

As illustrated in FIG. 24, wires 24 and first electrodes 25 are provided on the front surface 2*a* of the transparent glass 23 of the array substrate 2. Specifically, the first terminal 101 and the fifth terminal 201 are electrically coupled to each other through a wire 24. The second terminal 102 and the sixth terminal 202 are electrically coupled to each other through a wire 24. The third terminal 103 and the seventh terminal 203 are electrically coupled to each other through a wire 24. The fourth terminal 104 and the eighth terminal 204 are electrically coupled to each other through a wire 24. A plurality of first electrodes 25 are coupled to the wire 24 connecting the second terminal 102 and the sixth terminal 202. A plurality of first electrodes 25 are coupled to the wire 24 connecting the third terminal 103 and the seventh terminal 203. Note that couplers C1 and C2 are provided on the wires 24.

As illustrated in FIG. 25, wires 32 and second electrodes 33 are provided on the front surface 3*a* of the counter substrate 3. Specifically, the wires 32 are provided on the y1 side and the y2 side, respectively. The wires 32 extend in the x direction. The second electrodes 33 are electrically coupled to the wires 32. The second electrodes 33 extend in the y direction. Note that couplers C3 and C4 are provided on the wires 32. In the example illustrated in FIGS. 24 to 26, the number of first electrodes 25 and the number of second electrodes 33 are eight, but these numbers are schematic and are not necessarily the actual numbers of first electrodes 25 and second electrodes 33. The number of first electrodes 25 and the number of second electrodes 33 only need to be equal to or larger than two and thus may be equal to or larger than nine.

As illustrated in FIGS. 26 and 27, the counter substrate 3 is disposed at an interval on the upper side relative to the array substrate 2. The liquid crystal layer 4 fills between the array substrate 2 and the counter substrate 3. The coupler C1 of the array substrate 2 and the coupler C3 of the counter substrate 3 are electrically coupled to each other through a conductive pillar (not illustrated). The coupler C2 of the array substrate 2 and the coupler C4 of the counter substrate 3 are electrically coupled to each other through a conductive pillar (not illustrated).

As illustrated in FIG. 26, the first terminal 101, the second terminal 102, the third terminal 103, the fourth terminal 104, the first pad 105, the second pad 106, the third pad 107, and the fourth pad 108 can be electrically coupled to flexible printed circuits (FPC) 40 illustrated with dashed and double-dotted lines. For example, the light modulation panels 1-1 to 1-4 are each coupled to the D/A converter 64 through the individually provided FPC 40.

Figure 28:
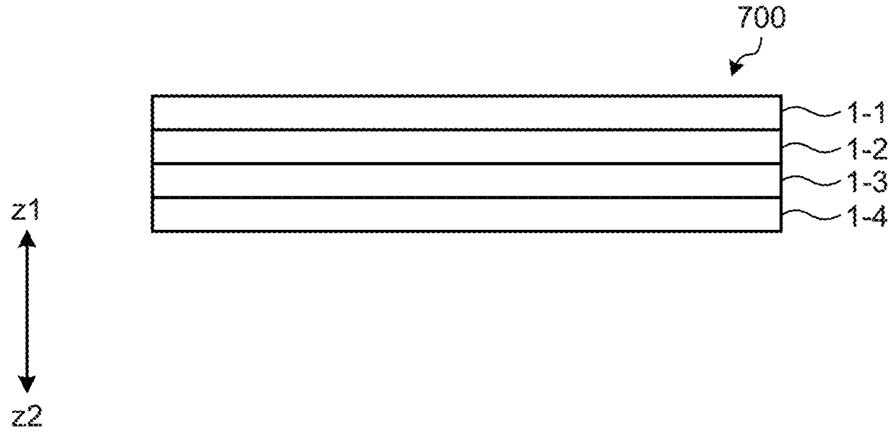
FIG. 28 is a schematic diagram illustrating the configuration of a liquid crystal light distribution part.

FIG. 28 is a schematic diagram illustrating the configuration of the light modulator 700. As illustrated in FIG. 28, the light modulator 700 includes, for example, four light modulation panels 1-1 to 1-4 stacked in the z direction. The four light modulation panels 1-1 to 1-4 are the light modulation panels 1-1 to 1-4 described above with reference to FIGS. 23 to 27. The four light modulation panels 1-1 to 1-4 are stacked so that the liquid crystal layers 4 thereof overlap one another and disposition of the first electrodes 25 and the second electrodes 33 included in each light modulation panel overlaps those of the others at a plan viewpoint. A plan viewpoint is the viewpoint of a front view of a plane including the x direction and the y direction. A region in which the first electrodes 25 and the second electrodes 33 are disposed functions as a light distribution control region LDA illustrated in FIG. 29 and the like to be described later.

Figure 29:
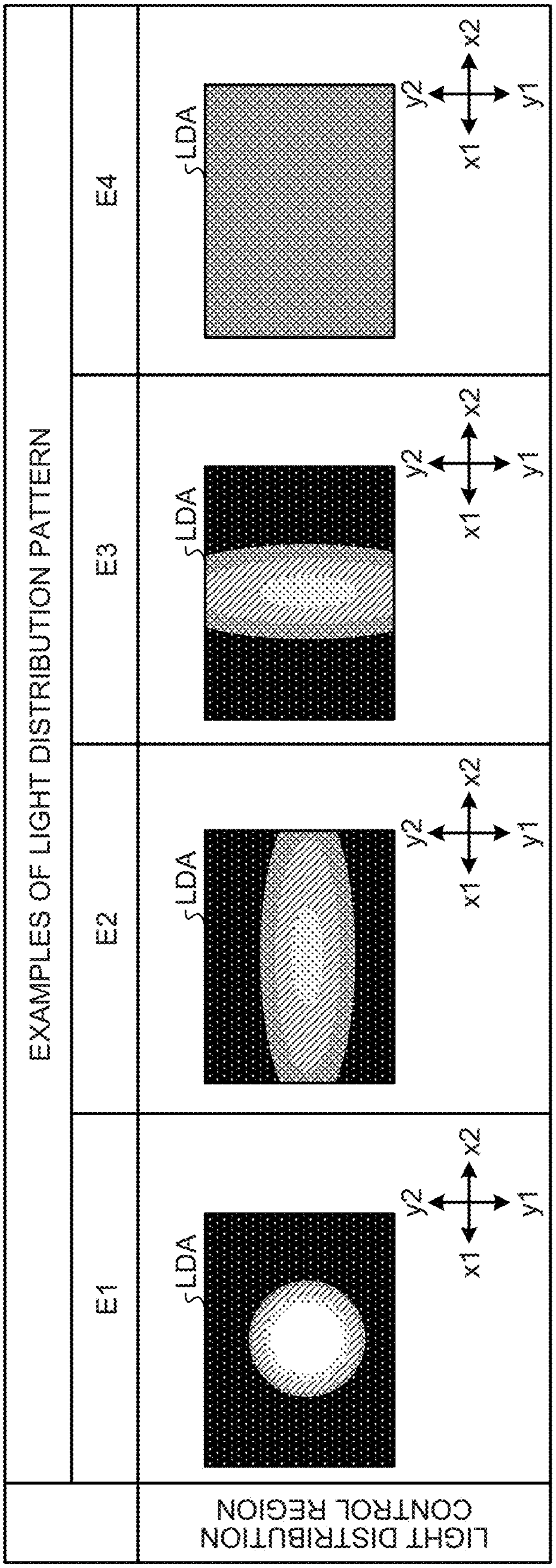
FIG. 29 is a schematic diagram illustrating an example of light distribution control by a light distribution control region.

FIG. 29 is a schematic diagram illustrating an example of light distribution control by the light distribution control region LDA. As described above, the light distribution control region LDA is a region in which the first electrodes 25 and the second electrodes 33 are disposed at a plan viewpoint. In other words, the light distribution control region LDA includes a plurality of electrodes extending in the x direction and arranged in the y direction and a plurality of electrodes extending in the y direction and arranged in the x direction. The electrodes extending in the x direction and arranged in the y direction are, for example, the first electrodes 25. The electrodes extending in the y direction and arranged in the x direction are, for example, the second electrodes 33.

Since the light modulator 700 includes the four light modulation panels 1-1 to 1-4 overlapping one another in the z direction, the electrodes extending in the x direction and arranged in the y direction and the electrodes extending in the y direction and arranged in the x direction are quadruplicated in the z direction. The light distribution control region LDA can control the transmission area and transmission degree of light traveling from one surface side of the light modulator 700 toward the other surface side as in Examples E1, E2, E3, and E4 as "exemplary light distribution patterns" illustrated in FIG. 29 by controlling the potential of each of the electrodes extending in the x direction and arranged in the y direction and the electrodes extending in the y direction and arranged in the x direction of the four light modulation panels 1-1 to 1-4 included in the light modulator 700.

Note that, in the following description, equal potential is applied to electrodes overlapping each other at a plan viewpoint. Example E1 in FIG. 29 is a schematic diagram illustrating the state of the light distribution control region LDA when viewed at a plan viewpoint from a side opposite a light source (for example, a light source 800) in a case where the potentials of the electrodes extending in the x direction and arranged in the y direction and the electrodes extending in the y direction and arranged in the x direction are all 0 volt (V). In Example E1, light from the light source transmits through the light distribution control region LDA with almost no change.

Example E2 is a schematic diagram illustrating the state of the light distribution control region LDA when viewed at a plan viewpoint from a side opposite a light source (for example, a light source 800) in a case where the potentials of the electrodes extending in the x direction and arranged in the y direction are 0 volt (V) and the potentials of the electrodes extending in the y direction and arranged in the x direction exceed 0 volt (V). Example E2 illustrates the state of the light distribution control region LDA when controlling light distribution so that, when light spread in the x direction and light spread in the y direction are compared, light from the light source relatively largely spreads in the x direction but does not much spread in the y direction.

Example E3 is a schematic diagram illustrating the state of the light distribution control region LDA when viewed at a plan viewpoint from a side opposite a light source (for example, a light source 800) in a case where the potentials of the electrodes extending in the x direction and arranged in the y direction exceed 0 volt (V) and the potentials of the electrodes extending in the y direction and arranged in the x direction are 0 volt (V). Example E3 illustrates the state of the light distribution control region LDA when controlling light distribution so that, when light spread in the x direction and light spread in the y direction are compared, light from the light source relatively largely spreads in the y direction but does not much spread in the x direction.

Example E4 is a schematic diagram illustrating the state of the light distribution control region LDA when viewed at a plan viewpoint from a side opposite a light source (for example, a light source 800) in a case where the potentials of the electrodes extending in the x direction and arranged in the y direction and the electrodes extending in the y direction and arranged in the x direction all exceed 0 volt (V). Example E4 illustrates the state of the light distribution control region LDA being entirely dark when viewed from the side opposite the light source with the light distribution control region LDA interposed therebetween because light from the light source is significantly interrupted by the light distribution control region LDA.

Note that the light distribution control region LDA only needs to include, at a plan viewpoint, two or more electrodes extending in the x direction and arranged in the y direction and two or more electrodes extending in the y direction and arranged in the x direction. A first condition is such that one light distribution control region LDA includes m electrodes extending in the x direction and arranged in the y direction and n electrodes extending in the y direction and arranged in the x direction. A second condition is such that the number of electrodes (for example, first electrodes 25) extending in the x direction and arranged in the y direction is m×p and the number of electrodes extending in the y direction and arranged in the x direction (for example, second electrodes 33) is n×q in each of the four light modulation panels 1-1 to 1-4. With the first and second conditions as a premise, p light distribution control regions LDA in the x direction and q light distribution control regions LDA in the y direction can be set in a matrix of rows and columns in the light modulator 700. The numbers m, n, p, and q are natural numbers of two or more. Alternatively, the entire active region (region in which the liquid crystal layer 4 is provided) included in one light modulation panel at a plan viewpoint may be one light distribution control region LDA.

Examples E1, E2, E3, and E4 in FIG. 29 particularly illustrate difference in the shape of the light distribution area at a plan viewpoint by potential control. As described above with reference to FIGS. 14 and 15, the shape and size of the light transmission area can be more flexibly controlled because of the relation between potential provided to the first electrodes 25 and potential provided to the second electrodes 33. With this control, the shape and size of emitted light can be changed.

According to the present disclosure, it is possible to provide an illumination device and an illumination system that are capable of guiding a person when provided on a path.

What is claimed is:

1. An illumination device comprising:

a detector configured to detect that a mobile terminal device has entered a communication area corresponding to the device; and a light irradiator configured to emit light for guiding a person with the mobile terminal device detected by the detector, wherein the light irradiator emits light indicating a route through which the person with the mobile terminal device should proceed, the light irradiator includes a light source and a light modulator configured to deform light from the light source into an elliptical shape, and the light modulator deforms the light so that a long axis direction of the elliptical shape is aligned with a proceeding direction through the route.

2. The illumination device according to claim 1, further comprising a controller configured to control the light irradiator, wherein the controller acquires data related to an irradiation pattern corresponding to the route, and the light irradiator emits light based on the data.

3. The illumination device according to claim 2, wherein the data is data related to an irradiation pattern indicating size and shape of light to be emitted by the light irradiator.

4. The illumination device according to claim 1, wherein the light modulator includes a light modulation panel for p-wave polarization and a light modulation panel for s-wave polarization, the light modulation panel for p-wave polarization and the light modulation panel for s-wave polarization are stacked, signals based on light to be emitted are provided to the light modulation panel for p-wave polarization and the light modulation panel for s-wave polarization, and light emitted from the light source is emitted through the light modulation panel for p-wave polarization and the light modulation panel for s-wave polarization.

5. An illumination system comprising a plurality of illumination devices each including a detector and a light irradiator, the detector being configured to detect that a mobile terminal device has entered a communication area corresponding to the device, the light irradiator being configured to emit light for guiding a person with the mobile terminal device detected by the detector, wherein the illumination devices are provided along a route through which the person with the mobile terminal device should proceed, the light irradiator of each of the illumination devices emits light indicating a route through which the person with the mobile terminal device should proceed, the light irradiator includes a light source and a light modulator configured to deform light from the light source into an elliptical shape, the light modulator deforms the light so that a long axis direction of the elliptical shape is aligned with a proceeding direction through the route, and parts of communication areas corresponding to adjacent illumination devices among the illumination devices overlap each other.

* * * * *